United States Patent [19]
Birukawa et al.

[11] Patent Number: 6,146,740
[45] Date of Patent: Nov. 14, 2000

[54] MAGNETIC RECORDING MEDIUM AND METHOD OF FABRICATING THE SAME

[75] Inventors: Masahiro Birukawa, Hirakata; Yoshihiko Kudoh, Yawata, both of Japan

[73] Assignee: Matsushita Electric Industrial Co., Ltd., Osaka, Japan

[21] Appl. No.: 09/271,340

[22] Filed: Mar. 18, 1999

Related U.S. Application Data

[62] Division of application No. 08/348,203, Nov. 28, 1994, Pat. No. 5,993,937.

[51] Int. Cl.[7] ........................................... G11B 5/66
[52] U.S. Cl. .................. 428/141; 428/141; 428/694 ML; 428/694 TR; 428/694 BR; 428/694 SG; 428/694 MM; 428/694 GR; 428/900; 427/128; 427/129; 427/130; 427/307; 204/182.34
[58] Field of Search ............................ 428/141, 694 ML, 428/694 TR, 694 BR, 694 SG, 694 MM, 694 GR, 900; 427/128–130, 307; 204/192.34

[56] References Cited

U.S. PATENT DOCUMENTS

| | | | |
|---|---|---|---|
| 3,878,367 | 4/1975 | Fayling et al. | 360/131 |
| 3,986,205 | 10/1976 | Fayling et al. | 360/2 |
| 4,239,959 | 12/1980 | Gutterman | 235/493 |
| 4,982,076 | 1/1991 | Fujita | 235/493 |
| 5,047,274 | 9/1991 | Tsuya et al. | 428/65.6 |
| 5,062,021 | 10/1991 | Ranjan et al. | 360/135 |
| 5,119,258 | 6/1992 | Tsai et al. | 360/135 |
| 5,128,922 | 7/1992 | Inui et al. | 369/280 |
| 5,162,158 | 11/1992 | Christner et al. | 428/611 |
| 5,191,563 | 3/1993 | Lee et al. | 369/13 |
| 5,296,995 | 3/1994 | Yonezawa et al. | 360/135 |
| 5,350,618 | 9/1994 | Togawa et al. | 428/156 |
| 5,370,932 | 12/1994 | Inaba | 428/323 |
| 5,416,754 | 5/1995 | Washo | 369/13 |
| 5,508,077 | 4/1996 | Chen et al. | 428/64.3 |
| 5,518,826 | 5/1996 | Kudoh | 428/694 ML |
| 5,534,321 | 7/1996 | Alpha et al. | 428/64.2 |

FOREIGN PATENT DOCUMENTS

| | | |
|---|---|---|
| 304873 | 11/1991 | European Pat. Off. . |
| 3-93058 | 4/1991 | Japan . |

*Primary Examiner*—Leszek Kiliman
*Attorney, Agent, or Firm*—Smith, Gambrell & Russell, LLP

[57] ABSTRACT

A read-only disk and a write-only disk recorded at high density having a magneto-optical film differing in coercive force depending on the information to be recorded disposed on a substrate. In the read-only and write-once disks, signals can be read employing only part of the irradiation beam, and thus super-resolution reading is realized.

9 Claims, 17 Drawing Sheets

Mean size in in-plane direction $<\alpha>$ (nm)

Mean size in perpendicular direction $<\beta>$ (nm)

Temperature (°C)

Hysteresis curve of
in-plane magnetized film

Hysteresis curve of
perpendicular magnetized film

Hysteresis curve of $Gd_{23}Fe_{46}Co_{31}$

24 °C

128 °C

MAGNETIC RECORDING MEDIUM AND METHOD OF FABRICATING THE SAME

This application is a division of U.S. application Ser. No. 08/343,203 filed Nov. 28, 1994 now U.S. Pat. No. 5,993,937.

BACKGROUND OF THE INVENTION

1. Field of the Invention

The present invention relates to a magnetic recording medium used in recording of a information. More particularly it is used in an external memory of computer, video or audio recording apparatus, game machine or other memory device, or integrated multi-media.

2. Description of the Prior Art

Recently, read-only recording media are widely spread for audio, video and data files, such as CD, LD, and CD-ROM. However, along with the distribution of optical recording media, lately, as versatile data are handled, there is a growing demand for higher density.

As one of the solutions, in the rewritable magneto-optical recording media, it is proposed to read a tiny written mark smaller than a laser spot diameter by the following method. That is, in the constitution having a separate recording layer and a reading layer, only in a limited narrow region in part of an irradiation region of an optical beam for reading, the information recorded in the recording layer is read while forming a state copying into the reading layer, and this method is called super-resolution reading.

This is the method disclosed in the Japanese Laid-open Patent No. 03-93058, and basically it is composed of two perpendicular magnetized films comprising a recording layer of high coercive force and a reading layer of low coercive force, and an exchange coupling force acts between the magnetized films. The reading principle of the thus composed magneto-magneto-optical recording medium is briefly described below. At room temperature, only the magnetization of the reading layer is aligned in one direction by a powerful external magnetic field (3 Koe or more). However, in the region elevated in temperature as the optical beam for reading is irradiated, the coercive force of the reading layer drops abruptly, and the written mark of the recording layer is copied in the reading layer by the exchange coupling action. Therefore, signals are generated only from the portion heated by the irradiation of optical beam for reading, whereas no signal is generated from the portion not elevated in temperature in the region irradiated with optical beam for reading.

This method is effective means for the recording medium to be recorded by the user as in the conventional magneto-optical recording, but is not applied to the read-only magneto-optical recording medium. As the method of super-resolution reading on a read-only magneto-optical recording medium, a method of a making use of difference between the reflectance of solid-phase state and reflectance in liquid-phase state is known (Yasuda et al. International Symposium Optical Memory and Optical Data Storage '93 Th3.2, 1993). In this method, GeSbTe is disposed on a substrate in which information is recorded in pit form, and a reflectance layer is further laminated. The principle of reading of the magneto-optical recording medium in this constitution is briefly described below. When reading by irradiating an optical beam from the substrate side, at room temperature, GeSbTe is in a solid-phase state, and the light transmittance of GeSbTe is large, and hence a certain reflected light is obtained. However, when the temperature is elevated by the optical beam for reading, GeSbTe is set in a liquid-phase state, and the light transmittance of GeSbTe decreases significantly, and the reflected light becomes extremely small.

Therefore, the read signal is limited to a cold portion only of the region irradiated with an optical beam for reading, and super-resolution reading is enabled in the read-only magneto-optical recording medium.

In such constitution, however, there are the following defects. The first problem is that an extremely large power is required in spite of read-only use because the reading temperature must be more than several hundred degrees in order to read while heating always to the liquid-phase state of GeSbTe. It means not only that a large output laser is needed, but also that substrate deterioration due to repeated reading or deterioration of GeSbTe film may result.

The second problem is that it is likely to pick up the crosstalk of the adjacent track to make it hard to narrow the track pitch because only the cold portion is read while masking the hot portion of the region irradiated with optical beam.

The third problem is that it is hard to use part of the recording medium for reading only and the other as a rewritable recording medium, that is, so-called partial ROM, or rewritable data file having read-only address information or control information. That is, the GeSbTe film itself is a rewritable recording medium making use of reversible changes between crystal state and amorphous state, but if the information is recorded by keeping this film always in a liquid-phase state, it is read while erasing it, and the phase-change recorded information cannot be read again.

SUMMARY OF THE INVENTION

In the light of the above problems, it is hence a primary object of the invention to present a magneto-optical recording medium for reading only, capable of performing super-resolution at a low operating temperature, narrowing the track pitch, and disposing on a same plane as a rewritable recording medium.

To solve the problems, in one magnetic recording medium of the invention, at least a partial region on the substrate is composed of a portion differing in roughness of surface, corresponding to the recorded information, and the magnetic characteristic of the magnetic film formed on the substrate is varied in each portion. Herein, one of the portions differing in roughness of surface is called a roughness portion, and the other is called a flat portion. The written mark corresponding to the recorded information may be formed either in the roughness portion or in the flat portion.

In the invention, the magnetic characteristic of the magnetic film provided on the substrate is different between the roughness portion and the flat portion. More specifically, it is desired that the coercive force at room temperature is different on the basis of the difference in the magnetic characteristic between the roughness portion and flat portion. However, the invention is not limited to this alone, and if the coercive force is the same at room temperature, the coercive force may be different at a temperature higher than room temperature. Moreover, on the basis of a difference in the magnetic characteristic, at room temperature or a temperature higher than room temperature, the difference may be such that it is a perpendicular magnetized film in the roughness portion and an in-plane magnetized film in the flat portion.

Incidentally, for reading these magnetic recording media, a conventional magnetic head or magneto-optical head is used. As the substrate of the magnetic recording medium of the invention, various materials may be used, including an inorganic oxide, polymer resin, and metals. Above all, polymer resins such as polycarbonate, olefin and PMMA are preferable because the read-only information composed of different roughness portions can be easily mass-duplicated by injection.

The magnetic film is not particularly specified as far as the magnetic characteristic such as coercive force and magnetic anisotropy varies due to difference in roughness of surface. In particular, when reproducing with a magneto-optical head, an alloy of rare earth and transition metal composed of at least one rare earth selected from Gd, Td, Dy, and Nd, and at least one transition metal selected from Fe and Co is preferable. Of course, a magnetic film composed of them together with additive elements such as Cr and Pt is also preferable.

In other magnetic recording medium of the invention, at least in a partial region, a micro-structure (derived from fluctuation of composition, density, crystallinity, etc.) that can be observed by transmission electron microscope in a magnetic film, or an atomic ordering structure, or a portion differing in crystal grain size is formed, corresponding to the recorded information, so that the magnetic anisotropy of the magnetic film may differ in each portion.

Moreover, the recording method into the magneto-optical recording medium of the invention comprises, when recording the information, 1) a constitution for varying the magnetic characteristic such as coercive force and magnetic anisotropy of the magnetic film in each portion, corresponding to the recorded information, by recording the magnetic characteristic in the magnetic film at such light intensity as to change irreversibly;
2) a constitution for varying the coercive force of the magnetic film in each portion, by forming portions differing in the magnitude of magnetic characteristic, corresponding to the recorded information, by recording at such light intensity as to diffuse mutually the laminated magnetic film and additive element film; or
3) a constitution for varying the coercive force of the magnetic film in each portion, by forming portions different in the micro-structure or crystal grain size, corresponding to the recorded information, by recording at such light intensity as to grow the micro-structure or crystal grain size that can be observed by a transmission electron microscope in the magnetic film.

These constitutions make use of the irreversible change by light beam, and are suitable for composing a write-once recording medium.

In such constitutions, the invention presents a read-only magnetic recording medium or a write-once magnetic recording medium of high S/N ratio, capable of reading at super-resolution at low operating temperature, and narrowing the track pitch, and it can be disposed on the same plane as a rewritable recording medium.

Its principle is more specifically described below.

First, the means for changing the coercive force of the magnetic film is described.

If there is a micro-structure or crystal boundary derived from fluctuation in composition, density, crystallinity or the like that can be observed by a transmission electron microscope in a magnetic film, the homogeneity in the film is impaired in that portion, and a disturbance occurs in the domain wall energy. Herein, the domain wall energy is an energy reserved in the domain wall, and when the domain wall energy varies with the position, in order to move the domain wall, a force expressed by its integral value is required. On the other hand, the domain wall is a region in which the direction of the spin which is the source of magnetization changes gradually, and it has a specific width, and therefore when the size of the microstructure or crystal grain becomes smaller than the width of the domain wall, the heterogeneity derived from them is averaged within the domain wall, and therefore the interaction of heterogeneity and domain wall becomes smaller, and it is easy to move the domain wall.

In the crystalline magnetic film, meanwhile, when the crystalline magnetic anisotropy is large, magnetization in each crystal grain is likely to occur in the direction of each easy axis for magnetization. In an ordinary polycrystalline film, since the direction of the crystal plane of each crystal grain (that is, the direction of easy axis for magnetization) is distributed randomly, if it is attempted to magnetize the magnetic film in one direction, the magnetization in the direction differing in each crystal grain is aligned in one direction while rotating. At this time, when the size of the crystal grain is sufficiently larger than the width of the domain wall, the domain wall is likely to exist in the boundary of each crystal grain, and movement of the domain wall is impeded, while, when the crystal grain size is smaller than the width of the domain wall, the domain wall is present over plural crystal grains, and the crystalline magnetic anisotropy of each crystal grain is averaged within the domain wall, and hence the interaction with the domain wall decreases, so that it is easier to magnetize.

That is, the coercive force can be changed by a specific magnitude relation of the domain wall width with the size of micro-structure or crystal grain.

Incidentally, when there is a certain roughness of surface on the substrate, the magnetic film formed thereon by sputtering method or vapor deposition method must be grown with a directivity in the direction of each micro-structure for composing the roughness surface. The micro-structures for composing the roughness surface have various directivities, and the magnetic film formed on the roughness surface is heterogeneous in density and crystallinity near the boundary of the micro-structures. Or when a crystalline magnetic film having a large crystalline magnetic anisotropy is formed on a roughness surface, directions of crystal grains (that is, directions of the easy axis for magnetization) are not uniform.

Therefore, if there is a certain roughness of surface on the substrate, the magnetic film formed thereon has a micro-structure or crystal grain boundary derived from fluctuation of density and crystallinity reflecting such roughness of surface.

If such micro-structure or crystal grain boundary is present, as mentioned above, it is possible to vary the coercive force by the relation of a certain magnitude between the domain wall width and size of micro-structure or crystal grain.

However, if the size of the micro-structure or crystal grain is more than a specific value, it is detected as noise at the time of optical reading, and the reading S/N ratio is lowered. Therefore, the size of micro-structure or crystal grain should be defined within a certain dimension so as not to cause noise.

Furthermore, when a specific element is added to the magnetic film, the magnetic anisotropy of the magnetic film may be increased or decreased. For example, such phenomenon is witnessed when a heavy rare earth metal element or other 3d transition metal element is added to a rare earth-transition metal compound magnetic film or 3d transition metal compound magnetic film. Generally, the magnitude of coercive force and magnitude of magnetic anisotropy are in positive relation, and in nearly similar materials, when the magnetic anisotropy is large, the coercive force is also large, or when the magnetic anisotropy is small, the coercive force is also small. Hence, in the magnetic film used as recording film, if there are portions differing in magnetic anisotropy due to composition changes, the coercive force can be varied in individual portions.

The principle of reading of the recording medium of the invention is described below. In a magneto-optical recording medium having different coercive forces depending on the information to be recorded, 1) the entire medium is magnetized in a magnetic field greater than any coercive force, and then
2) it is magnetized again reversely in a magnetic field greater than one coercive force and smaller than other coercive force, so that a written mark (domain) depending on the information to be recorded can be easily formed without recording in drive. Thus the prepared magnetic recording medium can be easily read by using an ordinary magnetic reading apparatus or magneto-optical reading apparatus, same as the conventional written mark recorded magnetically. This method is particularly convenient when presenting a read-only medium corresponding to an existing commercial magneto-optical drive.

The reading principle of super-resolution of recording medium of the invention is described below.

In FIG. 1(a), reference numeral 11 is a magnetic film composed of a magneto-optical film, comprising a low coercive force portion 11a and a high coercive force portion 11b corresponding to the recorded information. Reference numeral 12 is a reading light spot, 13 is a magnetic field for initializing, and 14 is a bias magnetic field. Curve 15 is a curve for showing the temperature of the magneto-optical film when reading, and corresponds to the position of the reading light spot 12. FIG. 1(b), curve 16 represents the temperature characteristic of coercive force of the high coercive force portion 11b, while curve 17 shows the temperature characteristic of the coercive force of the low coercive force portion 11a.

When reading, prior to irradiation with light for reading, the magneto-optical film is uniformly magnetized upward (or downward) in the initializing magnetic field 13. At this time, the intensity of magnetic field H2 of the initializing magnetic field 13 is required to be more than the coercive force H3 of the high coercive force portion 11b at room temperature. When the recording medium moves and passes through the reading light spot 12, the temperature of magneto-optical film varies as indicated by curve 15. At this time, a weak bias magnetic field 14 in a reverse direction of the initializing magnetic field 13 is applied, and the intensity of its magnetic field is H1.

Along with passing of the reading light spot 12, the temperature of the magneto-optical film rises, but until reaching temperature T1, the low coercive force portion 11a and high coercive force portion 11b both maintain a large coercive force by the bias magnetic field 14, so that the direction of magnetization is not changed. However, in the temperature range higher than T1 and lower than T2, in the low coercive force portion 11a indicated by curve 17, the bias magnetic field intensity H1 is superior to the coercive force, and the magnetization is inverted along the direction of the bias magnetic field 14. On the other hand, in the high coercive force portion 11b, since the coercive force indicated by curve 16 is superior to the bias magnetic field intensity H1, the magnetization is not inverted, and remains in the direction determined by the initializing magnetic field 13. As the temperature rises further, in the higher temperature region than T2, even in the high coercive force portion 11b indicated by curve 16, the bias magnetic field intensity H1 is superior to the coercive force, and the magnetization is inverted along the direction of the bias magnetic field 14. That is, of the reading light spot 12, only region A higher in temperature than T1 and lower than T2, the state of inverted magnetization is created along the recorded information, thereby contributing to detection and reading of recorded information. That is, the recording domain smaller than the reading light spot diameter hard to detect in the ordinary reading method can be detected and read.

In the above explanation of reading method, the intensity of light for reading was such that the maximum temperature of the magneto-optical film be T2 or more, but when the intensity of light for reading is such that the maximum temperature be somewhere between T1 and T2, the magnetization is inverted along the recorded information only in the region of the temperature of T1 or more and T2 or less, out of the reading light spot 12, so that reading operation of super-resolution may be realized.

The magneto-optical recording medium for realizing such super-resolution reading may be composed of any magnetic film differing in the coercive force depending on the recorded information and possessing a relatively large magneto-optical effect.

As the reading method for realizing such super-resolution reading by using the magneto-optical recording medium of the invention, reading while raising the temperature of the magneto-optical film over T1, and bias magnetic field 14 are needed, but the initializing magnetic field 13 is not necessarily required. That is, in the principle diagram in FIG. 1(a), the initializing magnetic field is provided in order to align the magnetization upward before reading action, but in the case of reading while raising the temperature of the magneto-optical film, owing to the downward bias magnetic field H1, the magnetization is uniformly downward after passing through the reading light spot 12, and by setting the bias magnetic field H1 upward when reading next time, the initializing magnetic field can be omitted.

These reading methods are convenient for keeping compatibility with the existing super-resolution reading methods.

Moreover, a recording method into some of the optical recording media of the invention is described below.

Generally, in the magnetic film as it is formed on a substrate by sputtering method or the like, the microstructure or crystal grain derived from fluctuation of density or crystallinity is likely to be fine, and this tendency is strong when deposited at low temperature. Such state is metastable as the energy state of substance, and by heating, the microstructure or crystal grain grows in a form of coupling adjoining micro-structures or crystal grains mutually so as to migrate to stabler state.

Accordingly, using the magnetic film in the deposition state with the size of the micro-structure or crystal grain smaller than the width of the domain wall of the magnetic film as the recording film, by recording at a light intensity capable of growing the size of the micro-structure or crystal grain in the recording film when recording the information, a coarse portion of micro-structure or crystal grain can be formed corresponding to the recorded information. When there are different size portions in the micro-structures or crystal grains, as mentioned above, the coercive force can be varied by the specific magnitude relation of the width of domain wall and micro-structure or crystal grain.

Incidentally, the coarse portion of micro-structure or crystal grain formed by this recording method can be formed finely by heating over the melting point of the magnetic film and quenching, and therefore the recorded information can be erased by the difference in magnitude of the micro-structure.

Besides, in the magneto-optical recording medium of which recording film is a laminate film composed of a magnetic film having a certain magnetic anisotropy and a film made of an additive element for increasing or decreasing the magnetic anisotropy of the magnetic film, in that state, there is no portion evidently different in the magnetic anisotropy in the magnetic film. However, when the magnetic film is heated over a certain temperature, the laminated magnetic film and additive element film begin to diffuse mutually, and are being alloyed gradually. In the alloyed portion, the magnetic anisotropy of the magnetic film increases or decreases, so that the coercive force also increases or decreases.

Hence, at the time of information recording, by recording at the intensity of light capable of mutually diffusing the laminated magnetic film and additive element film, portions differing in the magnitude of magnetic anisotropy are formed, and the coercive force of the magnetic film may differ in individual portions.

So far are described the recording method and reading method of magnetic recording medium having different coercive forces depending on the information to be recorded. It is, however, not the only intention of the invention to provide coercive force differences depending on the information to be recorded. For example, depending on the information to be recorded, one may be formed in a perpendicular magnetized film, and the other in an in-plane magnetized film. These can be realized easily by making use of the phenomenon that the perpendicular anisotropy is lost when irradiated with a further stronger power although the coercive force is lowered when rare earth-transition metal material is irradiated with a stronger power than in ordinary recording. That is, when irradiated with a stronger power than in recording, the atomic ordering structure is relaxed, and the perpendicular anisotropy decreases, and hence the coercive force is lowered. Therefore, when irradiated with a further stronger power, the perpendicular anisotropy is further decreased to form an in-plane magnetized film.

On the other hand, at room temperature, if it is an in-plane magnetized film (coercive force zero) regardless of the information to be recorded, when elevated in temperature by irradiation with optical beam for reading, it becomes a perpendicular magnetized film, and hence the invention is effective also in the magneto-optical film possessing a different coercive force depending on the information to be recorded at this time.

DESCRIPTION OF THE PREFERRED EMBODIMENTS

Figure 1A:
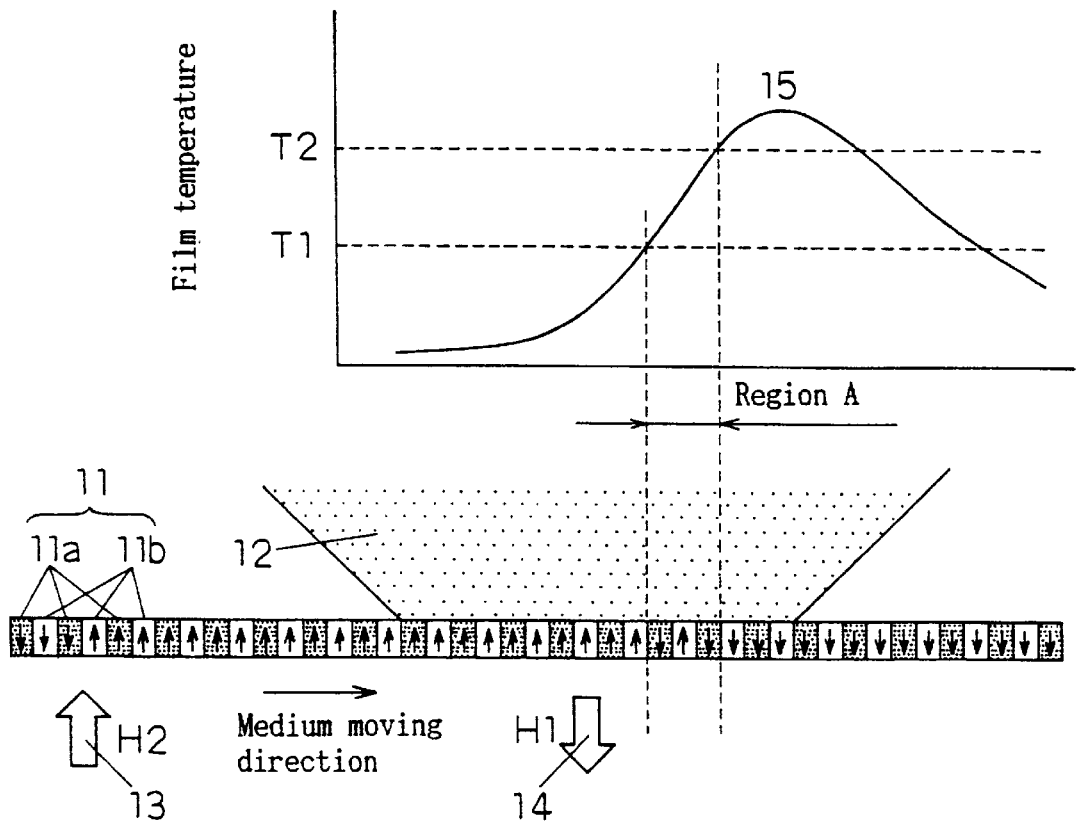
FIGS. 1(a) and 1(b) are principle drawings for explaining the operation of the invention.

Referring now to the drawings, the magnetic recording medium of the invention is described below in some of its embodiments.

First embodiment

Figure 2:
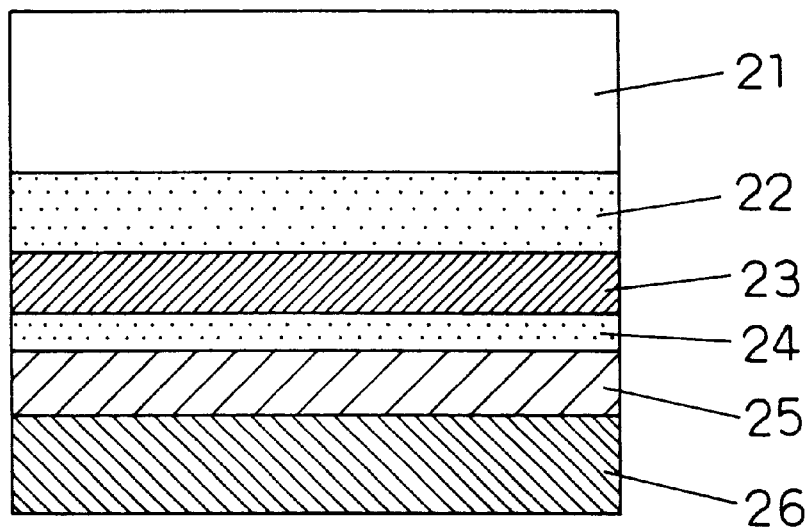
FIG. 2 is a constituent diagram of a magneto-optical recording medium in a first embodiment of the invention.

FIG. 2 is a sectional view showing a constitution of a magneto-optical recording medium in a first embodiment of the invention, and FIG. 3 shows a perspective view and a sectional view of the substrate in the magneto-optical recording medium of the embodiment.

In FIG. 2, a first protection layer 22, a magnetic film 23, a second protection layer 24, and a reflectance layer 25 are sequentially formed on a substrate 21 by RF sputtering method and DC sputtering method, and a protection coat layer 26 is further formed by spin coating method. Herein, showing examples of materials of constituent elements, the substrate 21 is made of polycarbonate or transparent plastic or glass, the first protection layer 22 and second protection layer 24 are made of nitride film such as SiN, the magnetic film 23 is a rare earth-transition metal compound magnetic film such as GdTbFeCo film, the reflectance layer 25 is a metal film such as Al film, and the protection coat layer 26 is an acrylic UV resin. Examples of thickness of the films are 100 nm for the first protection layer 22, 15 to 40 nm for the magnetic film 23, 10 to 20 nm for the second protection layer 24, 40 nm for the reflectance layer, and 5 $\mu$m for the protection coat layer 26.

Figure 3A:
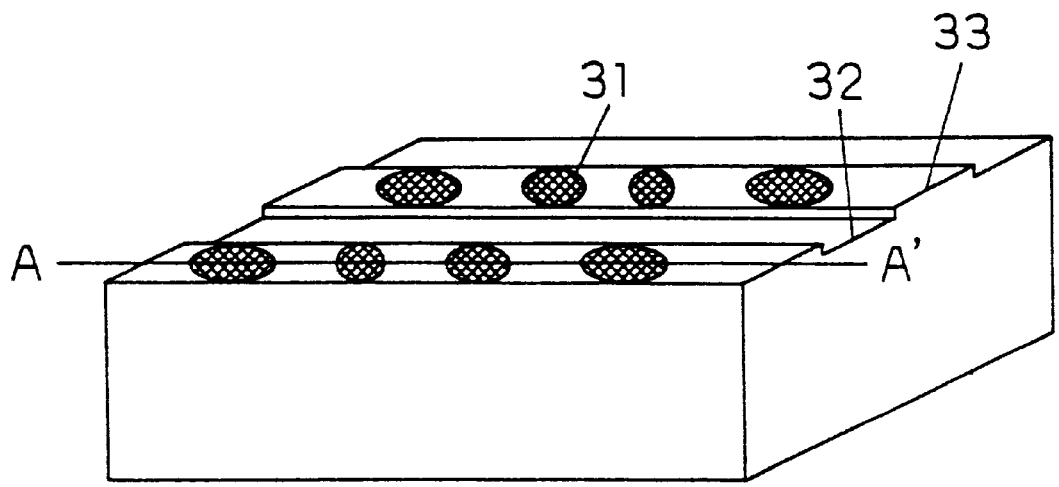
FIGS. 3(a) and 3(b), respectively, show and a sectional view of a substrate in the magneto-optical recording medium in the first embodiment of the invention.
Figure 3B:
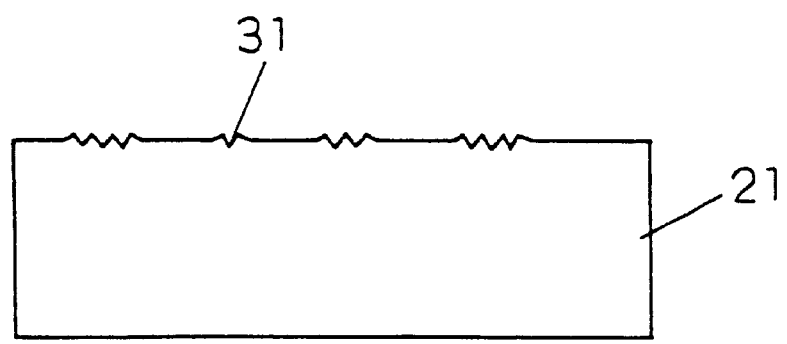

The substrate 21 is magnified and schematically shown in FIG. 3. In FIGS. 3(a) (a), and 3(b), the shaded area refers to a recording domain 31 formed on the surface of the substrate corresponding to the recording information, and its A-A' section is shown in FIG. 3(b). In the magneto-optical recording medium of the embodiment, by roughening the recording domain portion 31, on the substrate, as compared with the other portion, the recording information is expressed. Undulated grooves comprising 32 and 33 are guides for tracking control of the light spot at the time of reading.

Such substrate 21 can be fabricated easily by mass duplication method of conventional substrates, such as injection method, by using a master-substrate forming roughness portion and a flat portion (smooth surface), corresponding to the recording information. The fabricating procedure is described in two methods below while referring to the drawings.

Figure 4A:
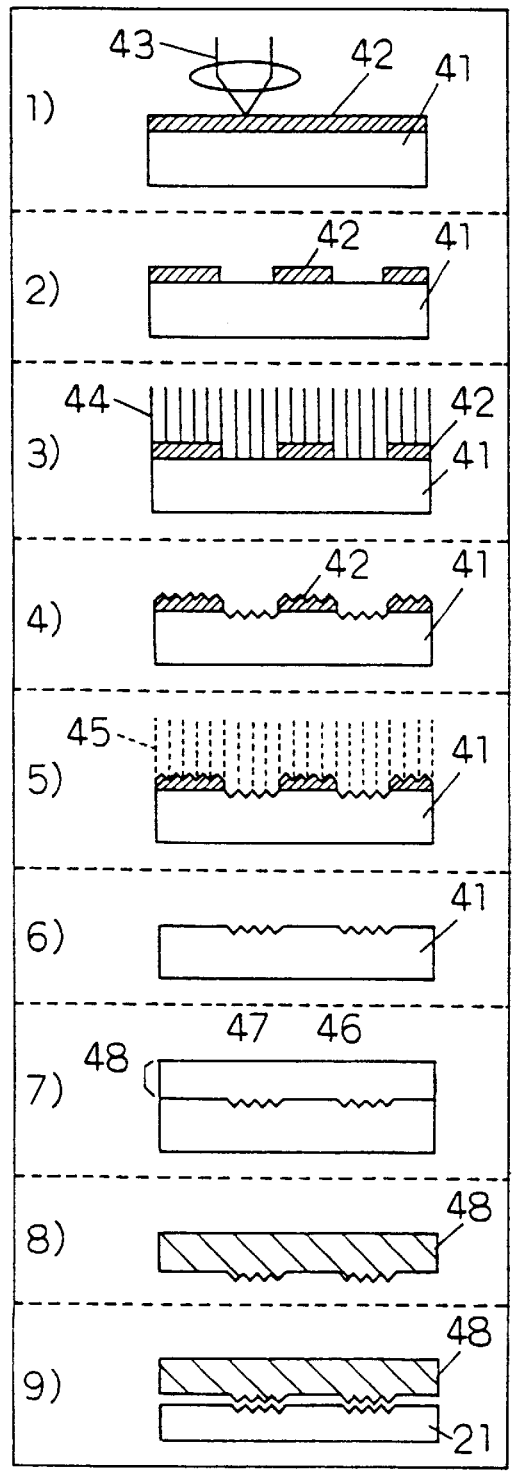
FIGS. 4(a) and 4(b) are diagrams showing a fabricating procedure of the substrate in the magneto-optical recording medium in the first embodiment of the invention.

A first method is explained. In this method, as in this embodiment, by roughening the recording domain area as compared with other area, the recording information is expressed. In FIG. 4(a), reference numeral 41 denotes a glass master-substrate, 42 is a photo resist, 43 is an argon laser beam, 44 is an etching ion particle beam, 45 is an ultraviolet ray, 46 is an Ni film, 47 is an Ni electroforming layer, 48 is a stamper, and 21 is a substrate.

The forming procedure is the sequence of 1), 2), 3) and so forth in FIG. 4(a).

1) The photo resist 42 applied on the smooth polished glass master-substrate 41 is heated, and exposed by cutting by the argon laser beam 43 modulated in power depending on the information to be recorded.

2) By developing in a developing solution, the photo resist 42 removed portions and unremoved portions are formed depending on the information to be recorded. So far, the procedure is same as in the conventional manner.

3) In this embodiment, plasma ion etching is executed next. This step is intended to roughen the exposed portion of the glass master-substrate 21 by developing. In this embodiment, using a mixed gas of CF$_4$ gas and Ne gas or a mixed gas of CF$_4$ gas and Ar gas, etching was performed for 20 to 120 seconds at a pressure of 1 to 20 mTorr and power of 0.7 to 2.0 W/cm$^2$. Herein, He gas is mixed in order to decrease the noise caused by roughening of the surface of the glass master-substrate. For example, by mixing a half amount Ne gas to CF$_4$ gas and etching, the noise level was reduced by about 2 dB.

4) After completion of plasma ion etching, the exposed portion of the glass master-substrate 41 and the surface of photo resist 42 was roughened.

5) Furthermore, the entire surface was irradiated with ultraviolet ray 45, and

6) Developed again in a developing solution, so that the photo resist 42 formed on the glass master-substrate 41 was completely removed.

7) After deposition of Ni film 46 on the glass master-substrate 41 by sputtering, it was used as an electrode, and a nickel electroforming layer 47 was provided in a specific thickness, and a stamper 48 was formed.

8) Peeling the stamper 48 off the glass master-substrate 41, the stamper 48 forming a roughness portion and a flat portion depending on the information to be recorded was completed. In this case, the recording domain area was the roughness portion.

9) Using this stamper 48, a substrate 21 corresponding to the roughness of surface of the stamper 48 was fabricated by injection method or the like.

If the substrate material is glass, meanwhile, and copying by injection is difficult, the substrate may be fabricated directly in the steps of 1) to 6) assuming the glass substrate to be a glass master-substrate.

Figure 4B:
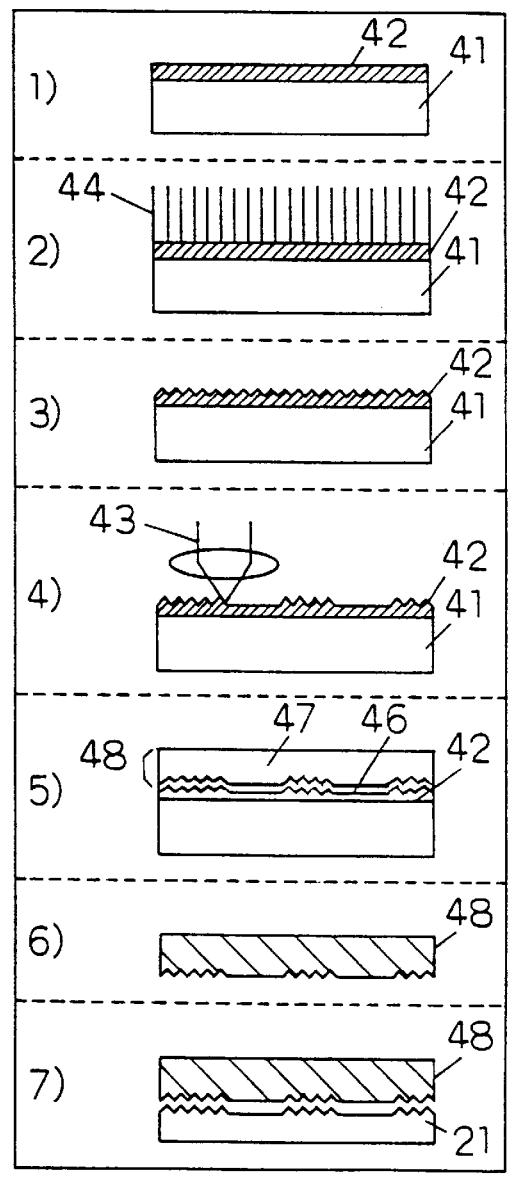

A second method is explained. In this method, different from the above embodiment, the recording information is expressed by smoothing the recording domain portion as compared with the other area (roughening the other portion than the recording domain). In FIG. 4(b), reference numerals indicate the same as in FIG. 4(a), except that the photo resist 42 is a material which has a property of being softened when sensitized to argon laser or softened in a high temperature state by argon laser irradiation. The fabricating procedure is the sequence of 1), 2), 3) and so forth in FIG. 4(b).

1) A photo resist 42 is applied on a smoothly polished glass master-substrate 41, and is heated. So far, the procedure is exactly same as in the conventional procedure.

2) In this embodiment, plasma ion etching is effected next. This step is intended to roughen the entire surface of photo resist 42. In this embodiment, using a mixed gas of N$_2$ gas and He gas or a mixed gas of O$_2$ gas and He gas, etching was performed for 20 to 120 seconds at a pressure of 1 to 20 mTorr and power of 0.2 to 0.5 W/cm$^2$. Herein, He gas is mixed in order to decrease the noise generated by roughening the photo resist surface. For example, by mixing a half amount of He to N$_2$ gas and etching, the noise level was reduced by about 2 dB.

3) The surface of the photo resist 42 was roughened after completion of plasma ion etching.

4) On the roughened photo resist 42, argon laser beam 43 modulated in power depending on the information to be recorded is emitted to soften and smooth the roughened surface of the photo resist. Therefore, depending on the information to be recorded, the flat portion and roughness portion are formed on the surface of the photo resist 42.

5) After depositing Ni film 46 on the photo resist 42 by sputtering, using it as an electrode, a nickel electroforming layer 47 is provided in a specific thickness, and a stamper 48 is formed.

6) Peeling off the stamper 48 from the glass master-substrate 41 and photo resist 42, the stamper 48 forming a flat portion and a roughness portion depending on the information to be recorded is completed.

7) Using this stamper 48, a substrate 21 corresponding to the roughness of surface of the stamper 48 is fabricated by injection method or the like.

Figure 5:
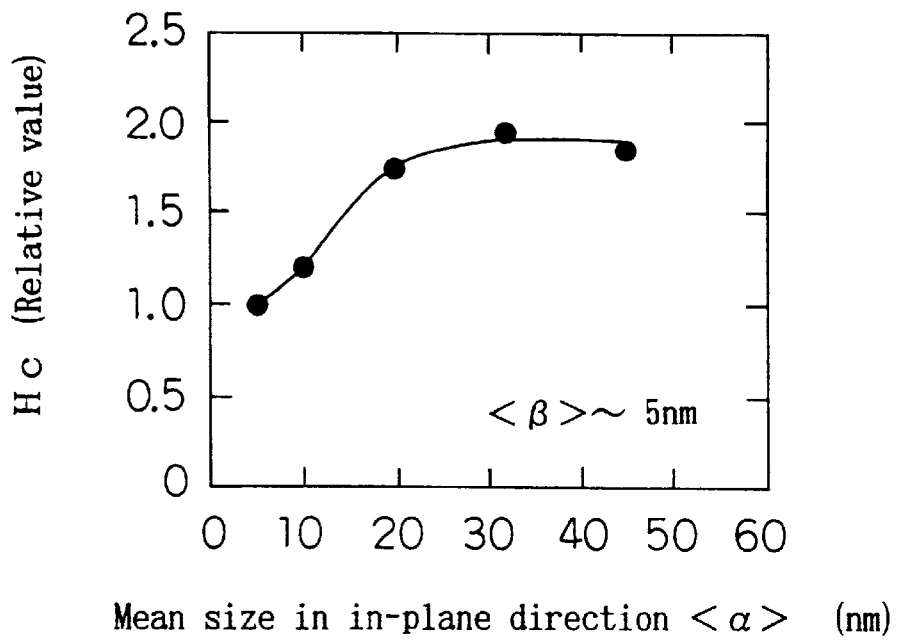
FIG. 5 is a diagram showing the relation of the in-plane direction dimension of roughness of surface and coercive force of magnetic film of the substrate in the magneto-optical recording medium in the first embodiment of the invention.

Back to FIGS. 3(a) and 3(b) the roughness of surface in the recording domain area 31 is expressed by dimension α in the in-plane direction and dimension β in the perpendicular direction, and each mean in the recording domain area 31 is expressed by <α> and <β>. FIG. 5 shows the relation between the coercive force and <α> of the magnetic film (GdTbFeCo film) in the case of <β> up to 5 nm, and FIG. 6 shows the relation between the coercive force and <β> in the case of <α> up to 45 nm.

Figure 6:
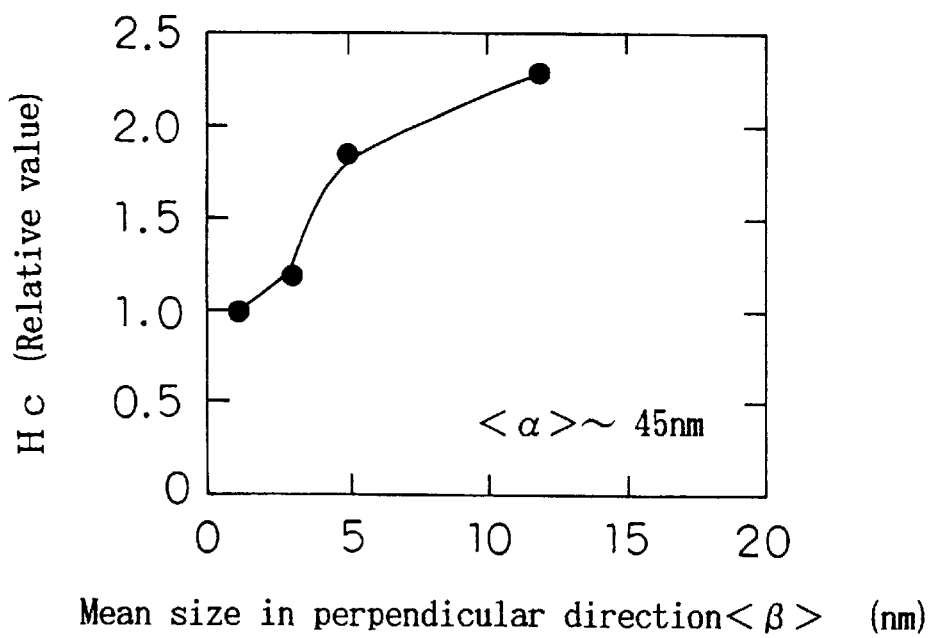
FIG. 6 is a diagram showing the relation of the perpendicular direction dimension of roughness of surface and coercive force of magnetic film of the substrate in the magneto-optical recording medium in the first embodiment of the invention.

It is known from FIG. 5 that the coercive force begins to increase when the mean dimension <α> of the roughness of surface in the in-plane direction becomes about 10 nm or more, and it is also known from FIG. 6 that the coercive force begins to increase when the mean dimension <β> of the roughness of surface in the perpendicular direction becomes about 3 nm or more.

Incidentally, seeing the magnetic anisotropy energy Ku of GdTbFeCo film of up to $2 \times 10^8$ erg/cc, and the exchange stiffness constant A of up to $2 \times 10^{-7}$ erg/cm, the domain wall width $\delta = \pi (A/Ku)^{1/2}$ is about 10 nm.

This fact corresponds very well with the phenomenon that the coercive force begins to increase when the mean dimension <α> of roughness of surface in the in-plane direction becomes about 10 nm or more in FIG. 5. This result proves the action of the invention stated above that the coercive force varies depending on a specific magnitude relation of the domain wall width and micro-structure when the microstructure reflecting the roughness of surface of the substrate exists. Besides, the width δ of the domain wall of a rare earth-transition metal compound magnetic film such as TbFe film and GdTbFe film is estimated to be around 10 to 20 nm, and a corresponding relation between coercive force and roughness dimension was recognized the same as in the GdTbFeCo film.

Figure 7:
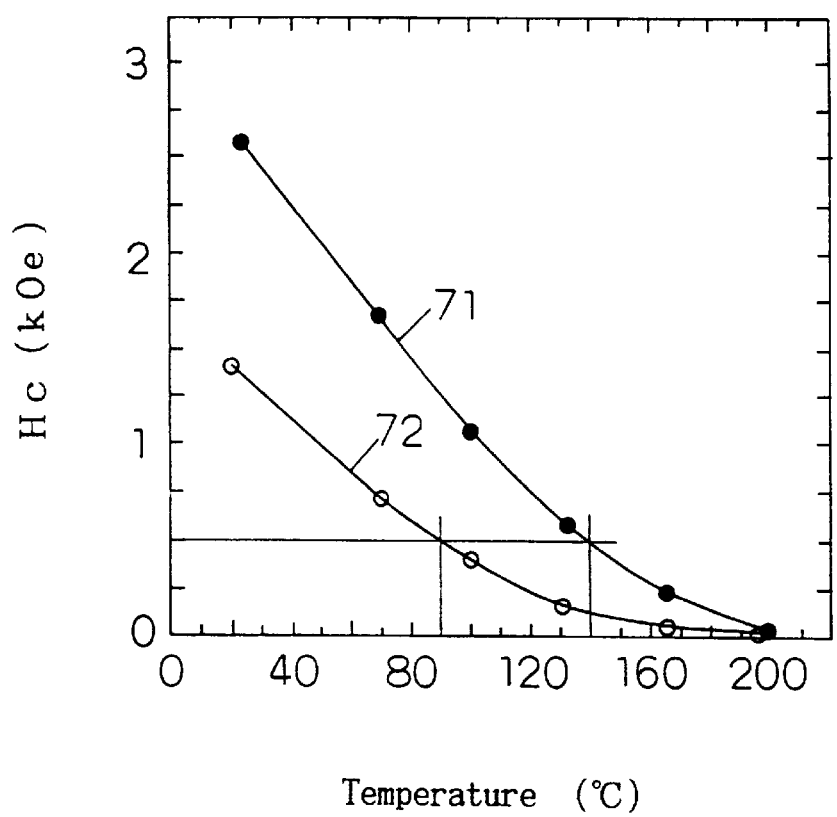
FIG. 7 is a diagram showing the temperature dependence of coercive force of the magnetic film in the portion differing in the roughness of surface of the substrate, in the magneto-optical recording medium in the first embodiment of the invention.

FIG. 7 shows the temperature dependence of the coercive force in the individual portions of the magneto-optical recording medium of the embodiment, forming the roughness portion with <α> up to 40 nm and <β> up to 5 nm and the flat portion with <α> up to 80 nm and <β> up to 1 nm on the substrate. Curve 71 indicates the roughness portion, and curve 72 denotes the flat portion. Herein, the curie temperature of the GdTbFeCo film as magnetic film is about 210° C. in this embodiment, and a coercive force difference of about two times is obtained in the entire temperature region from room temperature to curie temperature.

Hence, depending on the recording information, when the rare earth-transition metal alloy magnetic film is formed on the substrate having the portion with the mean roughness of surface in the in-plane direction and perpendicular direction of 10 nm or more and 3 nm or more respectively, and the portion with the mean roughness of surface in the in-plane direction and perpendicular direction of 10 nm or less and 3 nm or less, a magneto-optical recording medium possessing portions differing in the coercive force depending on the recording information is obtained.

Figure 8:
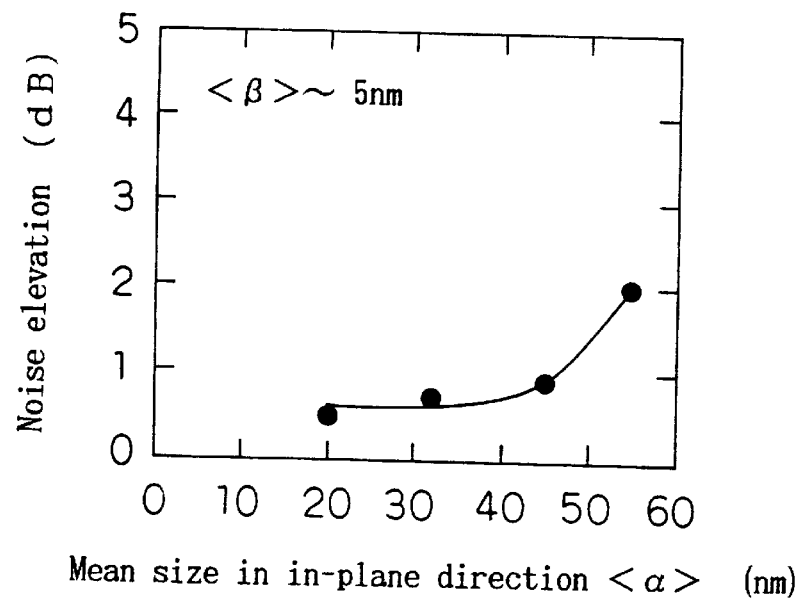
FIG. 8 is a diagram showing the relation between the in-plane direction dimension of roughness of surface and reading noise of the substrate in the magneto-optical recording medium in the first embodiment of the invention.

However, in order to increase the coercive force, if the mean roughness of surface in the in-plane direction and perpendicular dimension is respectively 10 nm or more and 3 nm or more, it is not enough for the magneto-optical recording medium of the embodiment. That is, it is necessary to prevent generation of noise in reading due to roughening. FIG. 8 shows the relation between the mean roughness in the in-plane direction <α> and reading noise at <β>=5 nm with laser of wavelength of 830 nm, in which the reading noise increases suddenly when <α> exceeds about 50 nm. Furthermore, at <α> up to 45 nm, if the mean roughness of surface in the perpendicular direction <β> becomes 20 nm or more, the reading noise increases, which is not appropriate.

Hence, the mean roughness of surface in the in-plane direction and perpendicular direction is preferred to be 50 nm or less and 20 nm or less, respectively.

Next, forming a magneto-optical recording medium setting the minimum dimension of the portions differing in the coercive force depending on the recording information (that is, recording domain) at 1.0 μm, it was preliminarily magnetized in batch in one direction, and a magnetic field in a reverse direction was applied in the magnetic field in the intermediate value of two coercive forces, and when it was read in a conventional magneto-optical reading apparatus, the signal could be read. Besides, in the same recording medium, by utilizing the portion without the coercive force differing portion corresponding to the recording information, when recorded (curie point recording) by using a conventional recording apparatus, recording and reading were effected same as in the prior art.

These facts mean that it is convenient for realizing a read-only disk or a partial ROM disk comprising a read-only portion and a rewritable portion suited to an existing commercial magneto-optical drive.

Figure 13:
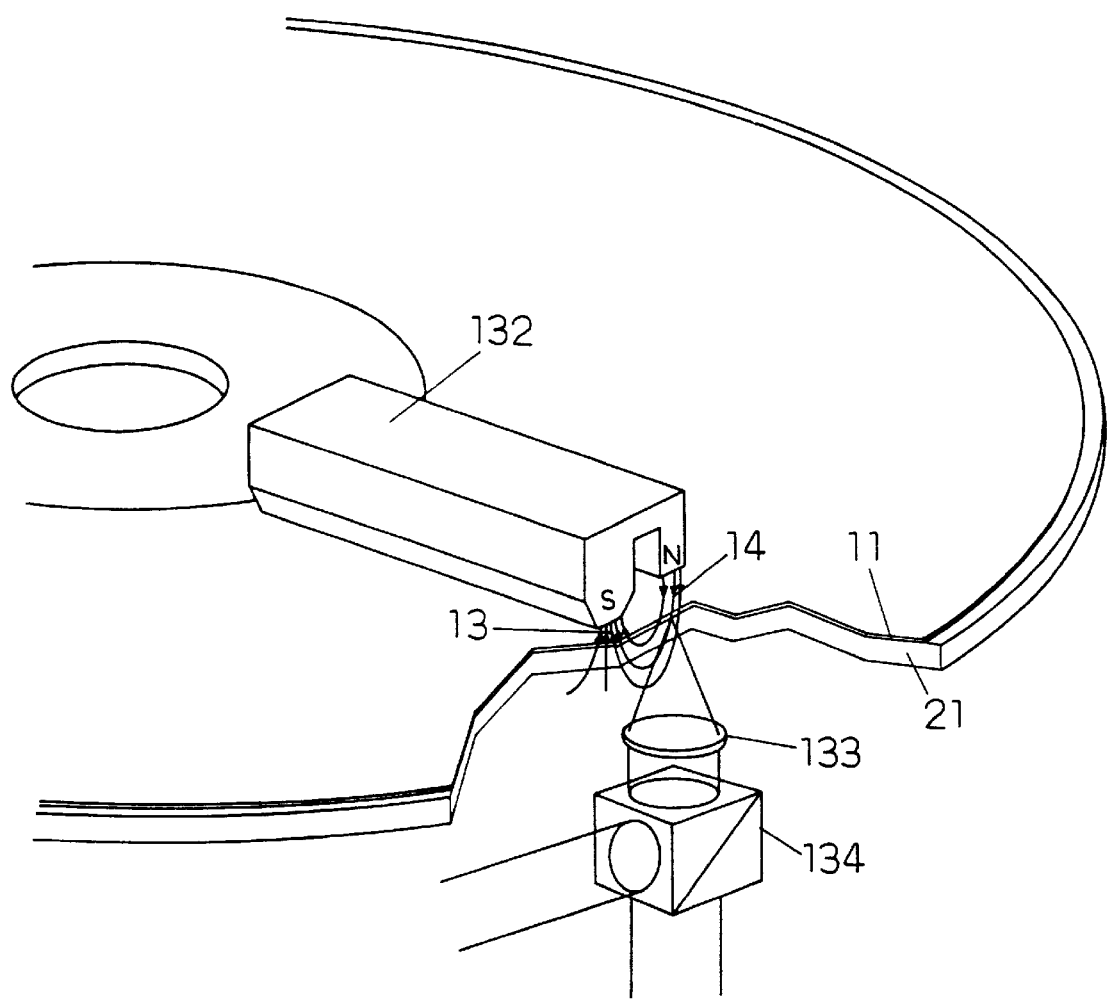
FIG. 13 is a perspective view of a basic portion of a reading apparatus in the embodiment of the invention.

Furthermore, a magneto-optical recording medium setting the minimum dimension of the portions differing in the coercive force depending on the recording information (that is, recording domain) at 0.6 μm or less which is difficult to detect with a light spot with wavelength of 830 nm is read in a reading method mentioned in the Summary of the Invention. A magneto-optical reading apparatus used in reading is shown in FIG. 13. The linear velocity is 5 m/s. What is particularly characteristic of the invention in reading the magneto-optical recording medium is magnetic field applying means 132, while the other constitution is same as the ordinary magneto-optical reading apparatus hitherto proposed. By the magnetic field applying means 132, as shown in FIG. 13, an initializing magnetic field 13 from the S pole and a bias magnetic field 14 from the N pole are applied to a magneto-optical film 11, and the bias magnetic field 14 from the N pole is applied to the position of the optical beam for reading. Each magnetic field may be always constant in direction and intensity, and therefore the magnetic field applying means 132 is preferred to be a permanent magnet from the viewpoint of saving of power consumption and reduction of size. Moreover, by forming in a size enough for covering the recording region in the radial direction of the disk, it is more effective because it is not necessary to move the magnetic field applying means 132.

Figure 9:
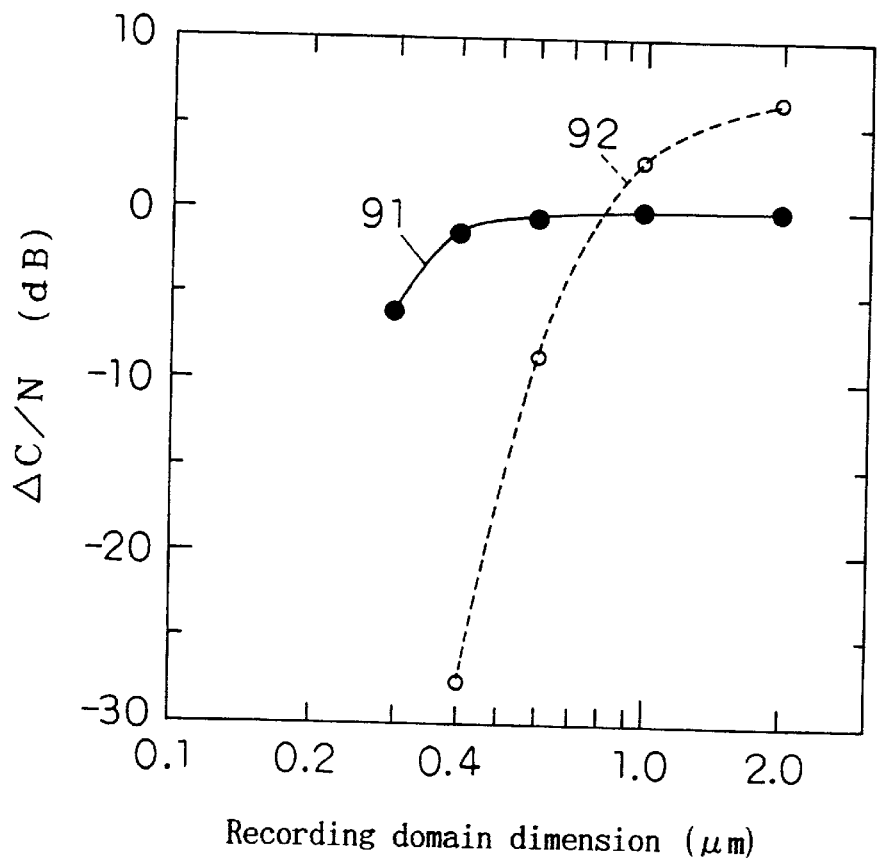
FIG. 9 is a diagram showing the relation between the recording domain dimension and the signal level, in the case of super-resolution reading of the magneto-optical recording medium in the first embodiment of the invention.
Figure 10:
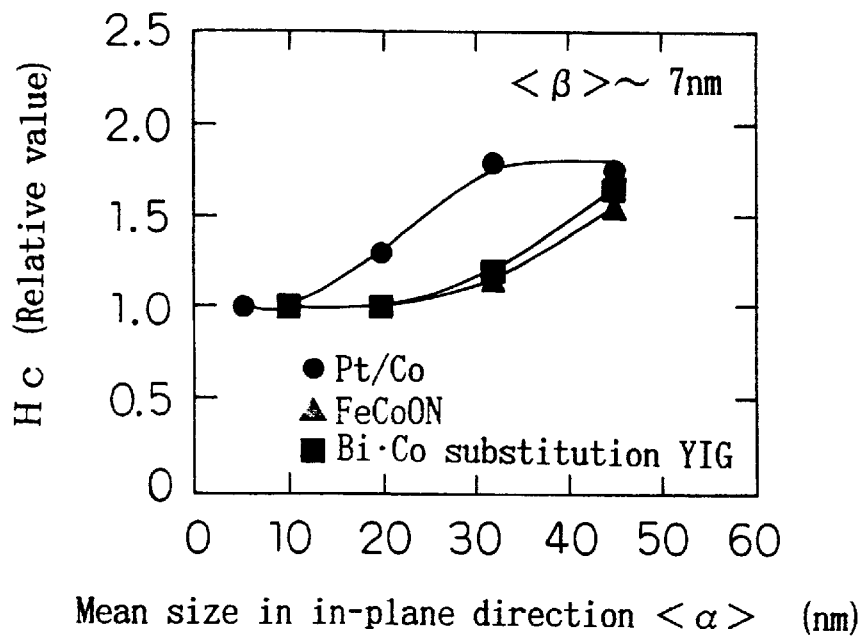
FIG. 10 is a diagram showing the relation of the in-plane direction dimension of roughness of surface and coercive force of magnetic film of the substrate in a magneto-optical recording medium in a second embodiment of the invention.

Defining the initializing magnetic field 13 in FIG. 10 to be 3 kOe and the bias magnetic field 14 to be 500 Oe, in the condition of linear velocity of 5 m/s, the magneto-optical recording medium setting the recording domain in various dimensions was read, and CN ratio changes (curve 91) at this time are shown in FIG. 9. For reference, CN ratio changes (curve 92) in ordinary recording and reading are also shown. The CN ratio on the axis of ordinates is plotted with the CN ratio at a recording domain dimension of 2 micron at 0 dB. As clear from FIG. 9, a greater CN ratio can be preserved for a smaller recording domain dimension, so that a magneto-optical recording medium of high density is realized.

In addition, as known from FIG. 7, the temperature rise necessary for reading is as low as 200° C. or less, and the detection region in the light spot is a high temperature portion relatively narrow in width in the track direction, and therefore super-resolution reading action is possible at a low working temperature, and therefore a read-only magneto-optical recording medium of high S/N ratio capable of narrowing the track pitch is realized.

As evident from the principle of the invention, the material and thickness of the constituent elements are not limited to them alone, and, for example, the first and second protection layers may be composed of other nitride films, ZnS film or other chalcogenide films, SiO film or other oxide films, or their mixture films, and the magnetic film may be composed of other rare earth-transition metal compound magnetic films having relatively high magneto-optical effects, such as TbFe, GdTbFe, TbFeCo, DyFe, GdDyFe, DyFeCo, GdDyFeCo, and NdTbFeCo.

That is, concerning the film composition, the presence of the magnetic film differing in coercive force depending on the information to be recorded is the essential constituent element of the invention, while the protection layers, reflectance layer and protection coat layers are provided properly only for keeping or improving the reliability, signal quality, or properties about heat distribution in recording and reading or the like.

In this magneto-optical recording medium, still more, corresponding to the recording information, when the portion differing in the roughness of surface of the substrate only by a specific value is provided in only a partial region on the substrate (for example, the inner peripheral region or the outer peripheral region), since the rare earth-transition metal compound magnetic film itself is a rewritable magnetic film, the rewritable portion can be also formed as a magneto-optical recording medium (so-called partial ROM) disposed on the same plane.

In this embodiment, meanwhile, the recording domain area 31 was roughened to be larger in coercive force than in the other area, but when the area other than the recording domain area 31 may be roughened to be larger in coercive force than in the recording domain area 31, the object of the invention of super-resolution reading action is possible by the recording method mentioned in the Operation of the Invention.

Second embodiment

In the magneto-optical recording medium according to the second embodiment of the invention in the medium constitution shown in FIG. 2, the magnetic film 23 is composed of noble metal/transition metal multi-layer film, transition metal oxide and nitride compound film, ferrite film or other 3d transition metal compound magnetic film possessing a relatively high magneto-optical effect, and glass is used as the substrate 21. The constituent elements of the magneto-optical recording medium of this embodiment may be same as in Embodiment 1, except for the magnetic film 23.

First, in the case of a noble metal/transition metal multi-layer film such as Pt/Co and Pd/Co fabricated by a DC sputtering method on a dielectric film such as SiN film, since the perpendicular magnetic anisotropy energy Ku is about 0.7 to $2\times10^8$ erg/cc, and the exchange stiffness constant A is about 0.8 to $1.3\times10^{-8}$ erg/cm, the width $\delta$ of this domain wall is estimated to be around 20 to 43 nm. Herein, the film thickness per layer of noble metal film is 0.8 to 3.5 nm, the film thickness per layer of transition metal is 0.1 to 1.5 nm, and the entire film thickness of the noble metal/transition metal multi-layer film is 15 to 40 nm.

In the case of a transition metal oxide and nitride compound film such as FeON and FeCoON fabricated on a dielectric film such as SiN film by a reactive ion beam sputtering method or the like, since the perpendicular magnetic anisotropy energy Ku is about 4 to $8\times10^5$ erg/cc, and the exchange stiffness constant A is about 0.6 to $1.2\times10^{-8}$ erg/cm, the width $\delta$ of this domain wall is estimated to be around 30 to 50 nm. Herein, the film thickness of the transition metal oxide and nitride compound film was 20 to 60 nm.

In the case of a ferrite film such as Co ferrite and Bi Co substitution garnet ferrite fabricated on a dielectric film such as SiN film by a reactive sputtering method or the like, since the perpendicular magnetic anisotropy energy Ku is about 0.2 to $1.5\times10^8$ erg/cc, and the exchange stiffness constant A is about 0.3 to $1.5\times10^{-8}$ erg/cm, the width $\delta$ of this domain wall is estimated to be around 30 to 50 nm. Herein, the film thickness of the ferrite film was 100 to 300 nm.

Incidentally, in the schematic magnified view of the substrate 21 in FIG. 3, the same as in Embodiment 1, the roughness of surface in the recording domain area 31 is expressed in dimension $\alpha$ in the in-plane direction and dimension $\beta$ in the perpendicular direction, and each mean in the recording domain area 31 is respectively $<\alpha>$ and $<\beta>$.

Such substrate 21 is fabricated, the sameness in Embodiment 1, by using a master-substrate forming roughness portion and flat portion (smooth portion) corresponding to the recording information, easily by conventional mass copying methods of substrates such as the injection method.

Figure 11:
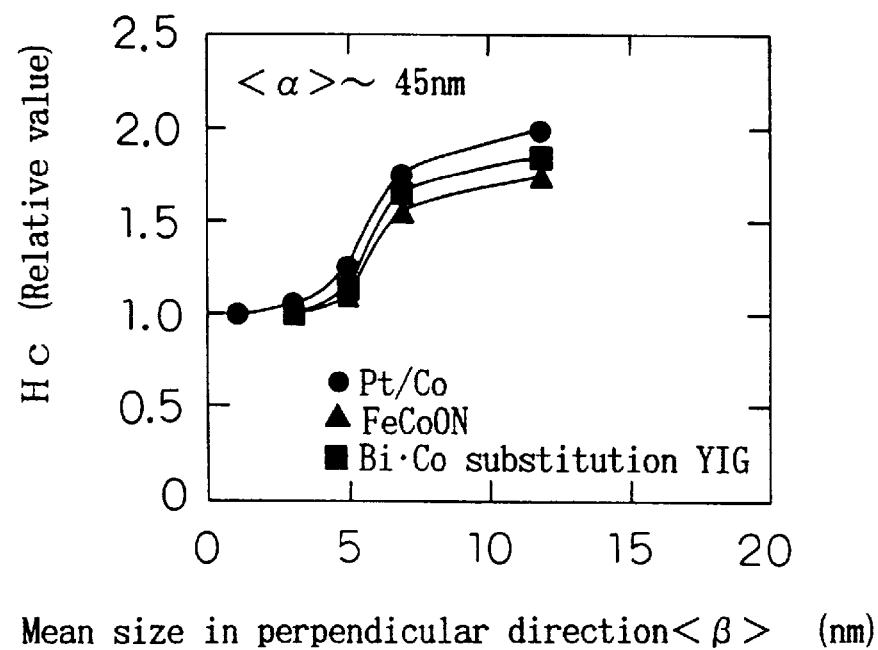
FIG. 11 is a diagram showing the relation of the perpendicular direction dimension of roughness of surface and coercive force of magnetic film of the substrate in the magneto-optical recording medium in the second embodiment of the invention.

FIG. 10 shows the relation between the coercive force and the mean roughness $<\alpha>$ in the in-plane direction of the magnetic film (Pt/Co multi-layer film, FeCoON film, Bi Co substitution YIG film i.e., a YIG film in which a part of yttruim or iron is substituted with Bi or Co) 23 with the mean roughness $<\beta>$ in the perpendicular direction in the recording domain area 31 of up to 7 nm. FIG. 11 shows the relation between the coercive force and mean roughness $<\beta>$ in the perpendicular direction of the magnetic film 23 with $<\alpha>$ up to 45 nm.

It is known from FIG. 10 that the mean roughness $<\alpha>$ in the in-plane direction for starting to increase the coercive force is about 20 nm in the Pt/Co multi-layer film, about 30 nm in the FeCoON film, and about 30 nm in the Bi Co substitution YIG film. It is known from FIG. 11 that the mean roughness $<\beta>$ in the perpendicular direction for starting to increase the coercive force is about 5 nm in all of the Pt/Co multi-layer film, FeCoON film and Bi Co substitution YIG film.

This result proves the action of the invention that the coercive force is changed by a specific magnitude relation of the width of the domain wall and micro-structure as the micro-structure reflecting the roughness of surface on the substrate is present as mentioned above.

When the temperature dependence of the coercive force was measured in individual portions of the magneto-optical recording medium of the embodiment comprising the portion with $<\alpha>$ up to 45 nm and $<\beta>$ up to 7 nm and the portion with $<\alpha>$ up to 80 nm and $<\beta>$ up to 1.5 nm on the substrate, a coercive force difference of about 1.6 times was confirmed in all temperature regions from room temperature to curie temperature.

Hence, by forming a magnetic film composed of a noble metal/transition metal multi-layer film such as Pt/Co multi-layer film, a transition metal oxide and nitride compound film such as FeCoON film, and a ferrite film such as Bi Co substitution YIG film, depending on the recording information, on the substrate comprising the portion with the mean roughness in the in-plane direction and in the perpendicular direction of 20 nm or more and 5 nm or more, respectively, and the portion with the mean roughness in the in-plane direction and in the perpendicular direction of 20 nm or less and 5 nm or less, respectively, a magneto-optical recording medium possessing portions differing in coercive force depending on the recording information is obtained.

However, same as in Embodiment 1, in order to achieve the super-resolution reading action of the invention by preventing noise generation and change of reflectivity in reading derived from roughening, the mean roughness in the in-plane direction <α> must be defined at 50 nm or less, and the mean roughness in the perpendicular direction <β> at 20 nm or less.

Therefore, by reading this magneto-optical recording medium in the reading method mentioned in the Summary of the Invention same as in Embodiment 1, super-resolution reading action is possible at a low working temperature, and the read-only magneto-optical recording medium of high S/N ratio capable of narrowing the track pitch can be realized.

As evident from the principle of the invention, the material and thickness of the constituent elements are not limited to them alone, and, for example, the first and second protection layers may be composed of other nitride films, ZnS film or other chalcogenide films, SiO film or other oxide films, or their mixture films, and in particular the second protection layer may be properly omitted. As for the magnetic film, as far as the width δ of the domain wall is about 20 to 50 nm, other 3d transition metal magnetic film with a relatively high magneto-optical effect may be used.

That is, concerning the film composition, the presence of the magnetic film differing in coercive force depending on the information to be recorded is the essential constituent element of the invention, while the protection layers, reflectance layer and protection coat layers are provided properly only for keeping or improving the reliability, signal quality, or properties about heat distribution in recording and reading or the like.

In this magneto-optical recording medium, still more, corresponding to the recording information, when the portion differing in the roughness of surface of the substrate only by a specific value is provided in only a partial region on the substrate (for example, the inner peripheral region or the outer peripheral region), since each above mentioned magneto-optical magnetic film itself is a rewritable magnetic film, the rewritable portion can be also formed as a magneto-optical recording medium (a so-called partial ROM) disposed on the same plane.

In this embodiment, meanwhile, the recording domain area 31 was roughened to be larger in coercive force than in the other area, but when the area other than the recording domain area 31 may be roughened to be larger in coercive force than in the recording domain area 31, the object of the invention of super-resolution reading action is possible by the recording method mentioned in the Operation of the Invention.

Third embodiment

Figure 12A:
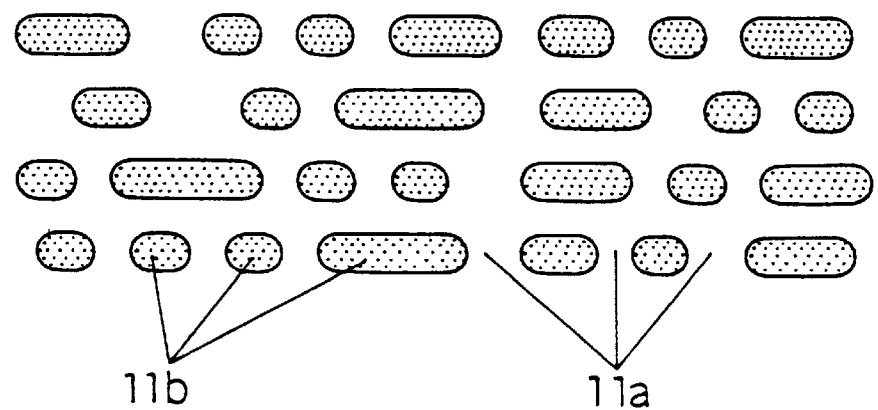
FIGS. 12(a) and 12(b) are constituent diagrams of a recording medium in a third embodiment of the invention.
Figure 12B:
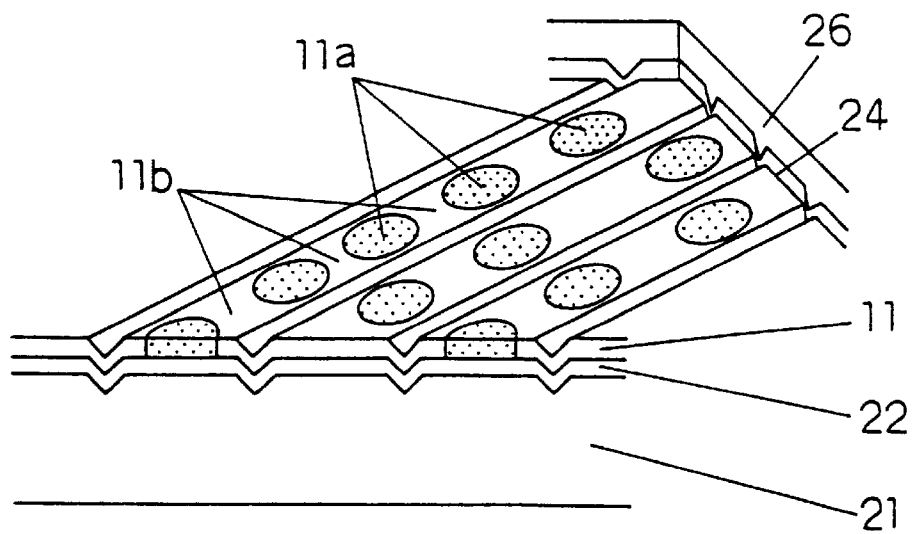

FIG. 12 shows the constitution of the recording medium in a third embodiment of the invention. In FIGS. 12(a) and 12(b), reference numeral 11 is a magneto-optical film composed of GdTbFeCo with the coercive force at room temperature of 900 Oe, curie temperature of 350° C. or more, and compensation temperature of 0° C. or less. This magneto-optical film 11 is, as shown in FIG. 12(b), formed on a substrate 21 through a first protection layer 22 made of a dielectric film. Herein, the substrate 21 is a polycarbonate substrate forming a V-shaped track guide groove in track pitch of 1.4 um, and the first protection layer 22 is a silicon nitride film with a thickness of 100 nm. On the magneto-optical film 11, a second protection layer 24 made of dielectric film, and a third protection layer 26 made of a resin layer are formed. Herein, the second protection layer 24 is a silicon nitride film with a thickness of 20 nm, and the third protection layer 26 is a urethane resin with a thickness of 5 um. Such film compositions are exactly the same as in the hitherto proposed compositions. What is characteristic of this embodiment is that a low coercive force portion 11a and a high coercive force portion 11b corresponding to the information to be recorded are provided in the magneto-optical film 11 as shown in FIGS. 12(a) and (b). In this embodiment, as shown in FIG. 12(a), the portion corresponding to the written mark area is the low coercive force portion, and the portion corresponding to the other area is the high coercive force portion.

A method of fabricating a magneto-optical film differing in coercive force corresponding to the information to be recorded is mentioned below. The constitution of the apparatus for forming written marks differing in coercive force is basically the same as in the hitherto proposed recording apparatus.

Using this recording apparatus, light pulses were irradiated at various pulse intervals, at a linear velocity of 1.3 m/s, pulse width of 100 nm, and peak power of 12 mW. This condition is the power of more than two times that of ordinary magneto-optical recording, and deterioration of perpendicular magnetic anisotropy occurs in the beam irradiated portion, and the coercive force is lowered consequently. When the recording medium irradiated with a light pulse by such means was first uniformly magnetized at 2 kOe and magnetized again at 500 Oe in a reverse direction, a reading signal was not obtained at all. However, by first uniformly magnetizing at 2 kOe or more and then magnetizing again at 600 Oe in reverse direction, when reproduced, a signal corresponding to the recorded signal was read. Therefore, in the condition of this embodiment, it is known that the coercive force is lowered to about 600 Oe or less in the beam irradiated portion. In this embodiment, by turning on or off the semiconductor laser according to the information to be recorded, the low coercive force portion 11a was formed, but it is also effective to turn on or off by EO modulator by using argon laser.

In particular, the forming method of written marks in this embodiment is capable of forming the low coercive force portion 11a by an ordinary disk drive, and therefore it is effective as a write-once disk, rather than as a read-only disk.

Figure 1B:
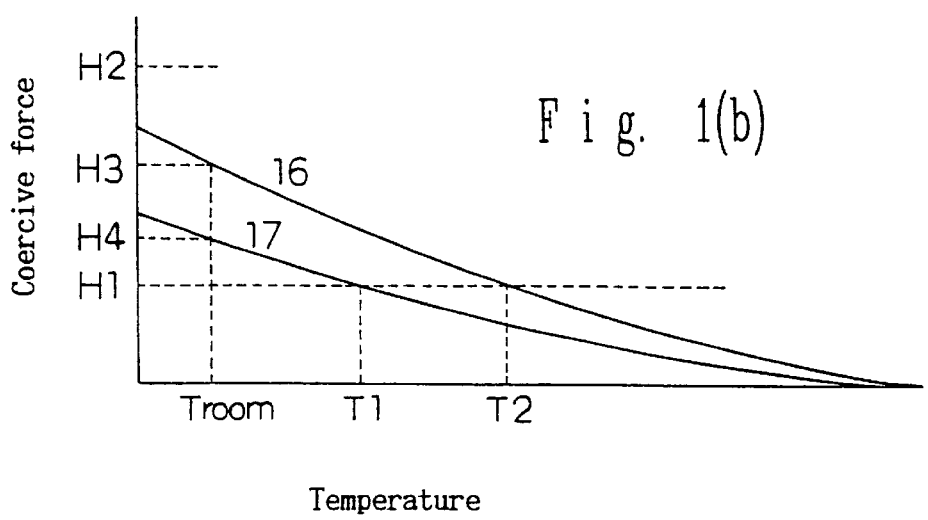

In the thus constituted magneto-optical recording medium, it was first confirmed that the recording magnetic domains can be formed along with elevation of temperature by means of a polarizing microscope. First the entire recording medium was magnetized at 1.2 kOe, and a magnetic field of 400 Oe was applied, and while heating the recording medium with a sheathed heater, formation of magnetic domains was observed by the polarizing microscope. As a result, no magnetic domain was observed at room temperature, but when heated to 110° C. or more, recorded magnetic domains were observed, and when further heated over 190° C., the magnetic domains disappeared again. It means that, in the temperature range from 110° C. to 190° C., the magnetization is inverted in the magnetic field of 400 Oe only in the portion lowered in coercive force by the light pulse irradiation for recording, and that, over 190° C., the magnetization is inverted also in the portion not irradiated with the light pulse. As known from these results, in this embodiment, when H1 shown in FIG. 1 is 400 Oe, T1 is 110° C. and T2 is 190° C.

In the magneto-optical reading apparatus shown in FIG. 13, the same reading as in Embodiment 1 was conducted. The linear velocity was 5 m/s. What is particularly characteristic of the embodiment in reading the magneto-optical recording medium lies in the magnetic field applying means 132, while the other constitution is the same as in the ordinary magneto-optical reading apparatus hitherto proposed. The magnetic field applying means 132 applies, as shown in FIG. 13, an initializing magnetic field 13 from the S pole and a bias magnetic field 14 from the N pole to the magneto-optical film 11, and the bias magnetic field 14 from the N pole is applied to the position of the optical beam for reading. Each magnetic field may be always constant in direction and intensity, and therefore the magnetic field applying means 132 is preferred to be a permanent magnet from the viewpoint of saving of power consumption and reduction of size. Moreover, by forming it in a size enough for covering the recording region in the radial direction of the disk, it is more effective because it is not necessary to move the magnetic field applying means 132. In the embodiment, the initializing magnetic field 13 on the magneto-optical film surface is 1.2 kOe, and the bias magnetic field 14 from the N pole is 400 Oe.

As a result of reading in this manner, the result nearly the same as in Embodiment 1 shown in FIG. 9 was obtained.

Fourth embodiment

Figure 14:
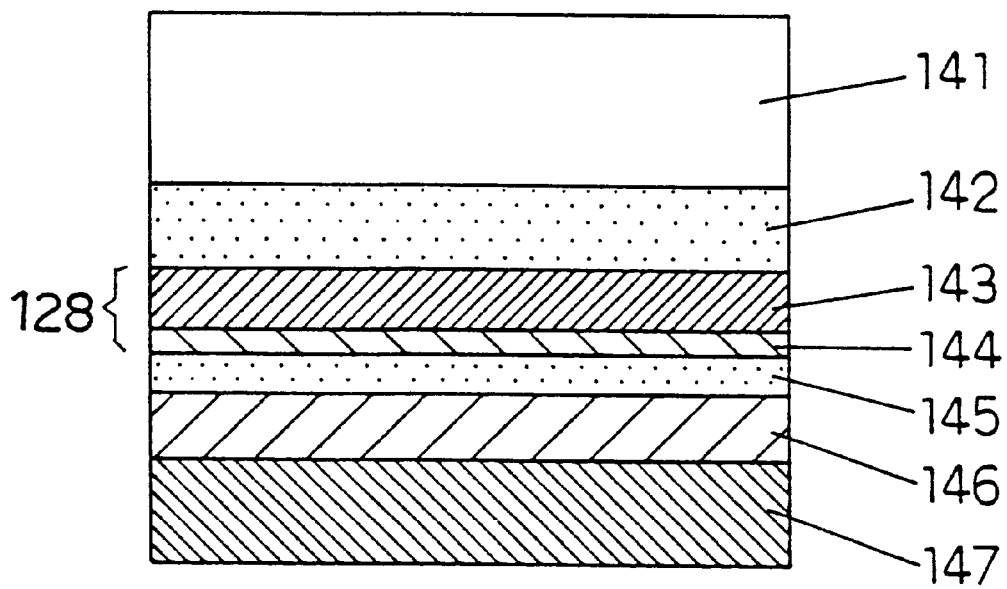
FIG. 14 is a constituent diagram of a magneto-optical recording medium in a fourth embodiment of the invention.
Figures 15A, 15B:
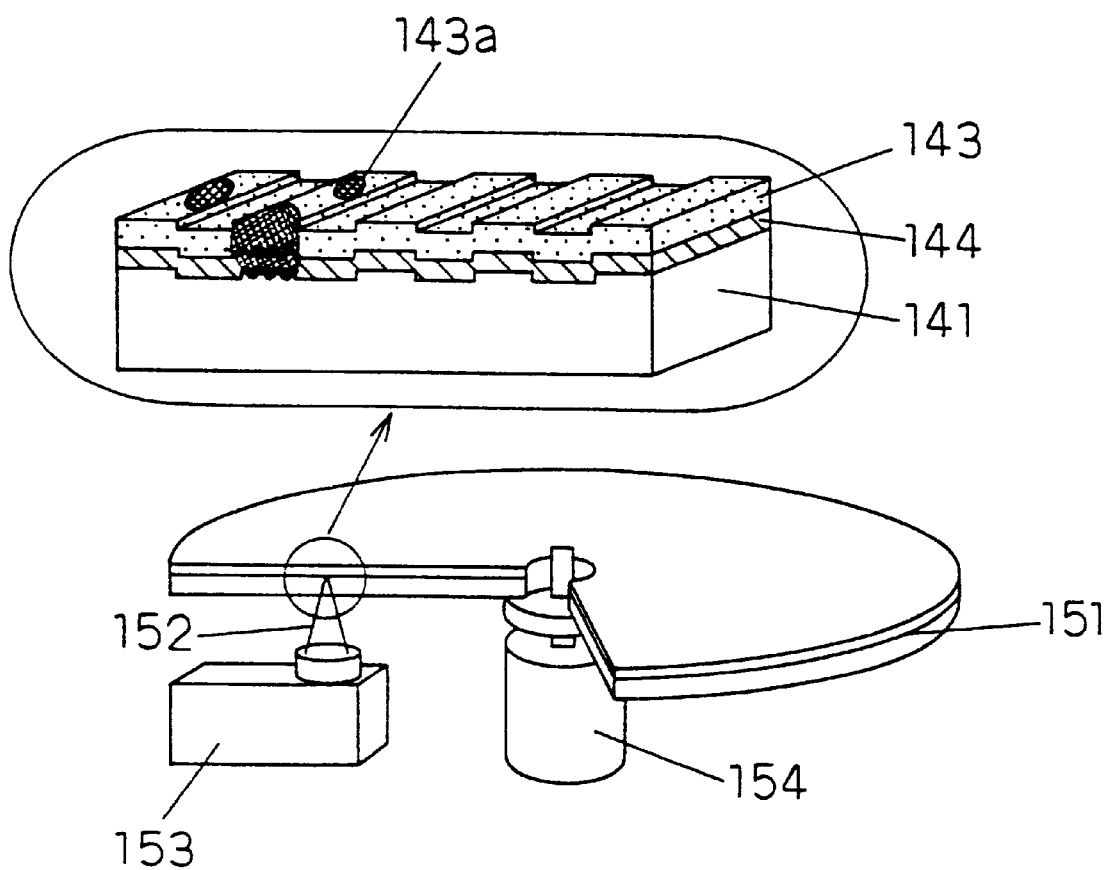
FIGS. 15(a) and 15(b) are schematic diagrams of a recording apparatus for the magneto-optical recording medium in the fourth embodiment of the invention.

FIG. 14 is a sectional view showing the constitution of the magneto-optical recording medium in a fourth embodiment of the invention, and FIGS. 15(a) and 15(b) schematically show the recording apparatus for varying partially the magnetic anisotropy of the magnetic film corresponding to the recording information in the magneto-optical recording medium of the embodiment.

In FIG. 14, a first protection layer 142, a magnetic film 143, an additive element film 144, a second protection layer 145, and a reflectance layer 146 are formed sequentially on a substrate 141 by a RF sputtering method and a DC sputtering method, and moreover a protection coat layer 147 is formed by spin coating method, and a magnetic film 128 is composed of the magnetic film 143 and additive element film 144. Showing examples of materials of these constituent elements, the substrate 141 is made of polycarbonate, transparent plastic or glass, the first protection layer 142 and second protection layer 145 are made of SiN or other nitride compound film, the magnetic film 143 is a rare earth-transition metal magnetic film such as GdTbFeCo film, the additive element film 144 is a heavy rare earth metal film such as Tb film, the reflectance layer 146 is a metal film such as Al film, and the protection coat layer 147 is an epoxy UV resin. The thickness of each film is, for example, 100 nm for the first protection layer 142, 15 to 30 nm for the magnetic film 143, 0.1 to 0.4 nm for the additive element film 144, 10 to 20 nm for the second protection layer 145, 40 nm for the reflectance layer 146, and 5 $\mu$m for the protection coat layer 147.

In FIG. 15(b), reference numeral 151 is a magneto-optical recording medium with already formed films on the substrate (films other than the magnetic film and additive element film are omitted for the sake of convenience), 141 is a substrate, 143 is a magnetic film, 143a is a recorded domain area, 144 is an additive element film, 152 is a recording laser beam, 153 is an optical head, and 154 is a spindle motor.

By rotating the magneto-optical recording medium 151 at a constant speed of 1.4 m/sec, while with scanning the recording laser beam 152 with the optical head 153, it is irradiated corresponding to the recording information, at an intensity of more than 1.5 times the ordinary recording power of the rewritable magnetic film of GdTbFeCo film (in this embodiment, in the composition of $Gd_{18}Tb_6Fe_{71}Co_5$, at a curie temperature of about 230° C.). By this recording process, in the recording domain area 143a, the magnetic film GdTbFeCo film and additive element Tb film diffuse mutually to be formed into one, and only in this area the Tb content in the composition of the magnetic film 143 increases.

As a result, corresponding to the recording information, the magnetic anisotropy of the recording domain area 143a becomes larger, and the coercive force in this area becomes larger than in the other area.

Figure 16:
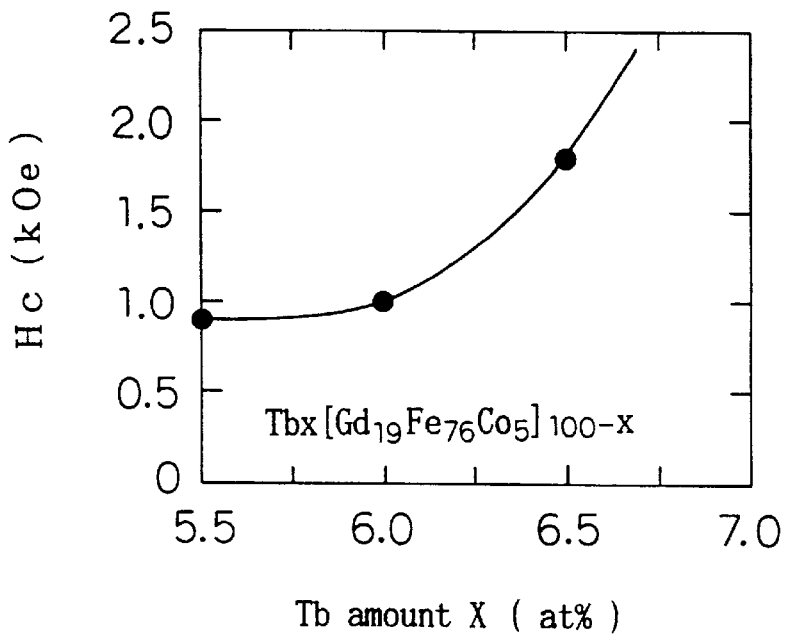
FIG. 16 is a diagram showing the relation of Tb content and coercive force in GdTbFeCo film.

FIG. 16 shows the relation between the Tb amount and coercive force in the GdTbFeCo film. When the composition is expressed by $Tbx[Gd_{19}Fe_{76}Co_5]_{100-x}$, when the Tb amount x increases from 6 at % to 6.5 at %, it is known that the coercive force is increased from 1 kOe to 1.8 kOe.

That is, by recording the magneto-optical recording medium having a magnetic film composed of a laminate film of magnetic film and an additive element film as in this embodiment in the process as mentioned above, the composition of the magnetic film is partially changed, and the magneto-optical recording medium having portions differing in the coercive force corresponding to the recording information can be obtained. Actually, in the thus obtained magneto-optical recording medium, when the temperature dependence of the coercive force was measured in each portion, it was confirmed that the coercive force difference of about 1.5 times was obtained in all temperature regions from room temperature to curie temperature.

Incidentally, the reflectivity of the magnetic film was hardly changed by slightly increasing the additive element, and the form of the magnetic film was hardly changed, and hence it was no cause for increasing the reading noise.

Therefore, by reading this magneto-optical recording medium in the reading method mentioned in the Summary of the Invention in the same manner as in Embodiment 1, super-resolution reading action is possible at a low working temperature, and therefore a read-only magneto-optical recording medium of high S/N ratio capable of narrowing the track pitch is realized. Still more, the forming method of recording domains as in this embodiment is applicable in an ordinary optical disk drive, and hence it is usable not only in a read-only disk but also in a write-once disk.

As evident from the principle of the invention, the material and thickness of the constituent elements are not limited to them alone, and, for example, the first and second protection layers may be composed of other nitride films, ZnS film or other chalcogenide films, SiO film or other oxide films, or their mixture films, and the magnetic film may be composed of other rare earth-transition metal compound magnetic films having relatively high magneto-optical effects, such as TbFe, GdTbFe, TbFeCo, DyFe, GdDyFe, DyFeCo, GdDyFeCo, and NdTbFeCo, or a transition metal oxide and nitride compound film, a ferrite film, or a 3d transition metal magnetic film, and the additive element film may be a heavy rare earth metal film aside from Tb.

That is, concerning the film composition, the presence of the magnetic film differing in coercive force depending on the information to be recorded is the essential constituent element of the invention, while the protection layers, reflectance layer and protection coat layers are provided properly only for keeping or improving the reliability, signal quality, or properties about heat distribution in recording and reading or the like.

In this magneto-optical recording medium, still more, corresponding to the recording information, when the portion differing in the roughness of surface of the substrate only by a specific value is provided in only a partial region on the substrate (for example, the inner peripheral region or the outer peripheral region), since the rare earth-transition metal compound magnetic film itself is a rewritable magnetic film, the rewritable portion can be also formed as a magneto-optical recording medium (so-called partial ROM) disposed on the same plane.

In this embodiment, meanwhile, by varying the composition so that the magnetic anisotropy of the recording domain area 143a may be larger than in the portion other than the recording domain area 143a, the recording domain area 143 is a portion of large coercive force, but to the contrary, if the composition is changed so that the magnetic anisotropy of the recording domain area 143a may be smaller than in the portion other than the recording domain area 143a so that the recording domain area 143a may be a portion of small coercive force, the object of the invention of super-resolution reading action is possible by the recording method mentioned in the Operation of the Invention.

Figure 17:
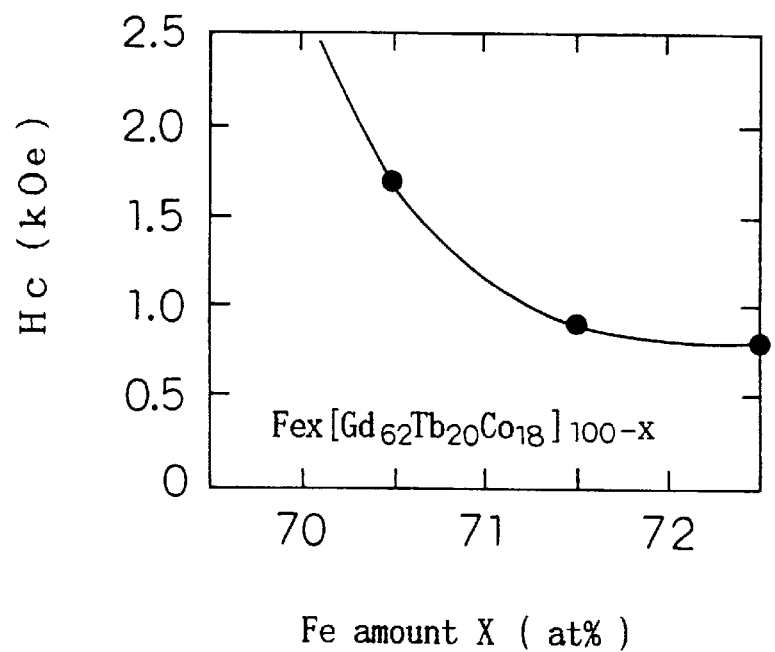
FIG. 17 is a diagram showing the relation of Fe content and coercive force in GdTbFeCo film.

In this case, the magneto-optical recording medium is obtained by recording in the recording apparatus in FIG. 15, by using GdTbFeCo film as the magnetic film 143 in FIG. 14 and Fe film as the additive element film 144. It is understood from the relation of the Fe amount and coercive force in the GdTbFeCo film shown in FIG. 17, that is, when expressed in the composition of Fex [$Gd_{62}Tb_{20}Co_{18}$]$_{100-x}$, the coercive force is decreased from 1.7 kOe to 0.9 kOe when the Fe content x is increased from 70.5 at % to 71.5 at %. Herein, the additive element film may be a Cd or other 3d transition metal film.

Fifth embodiment

Figure 18:
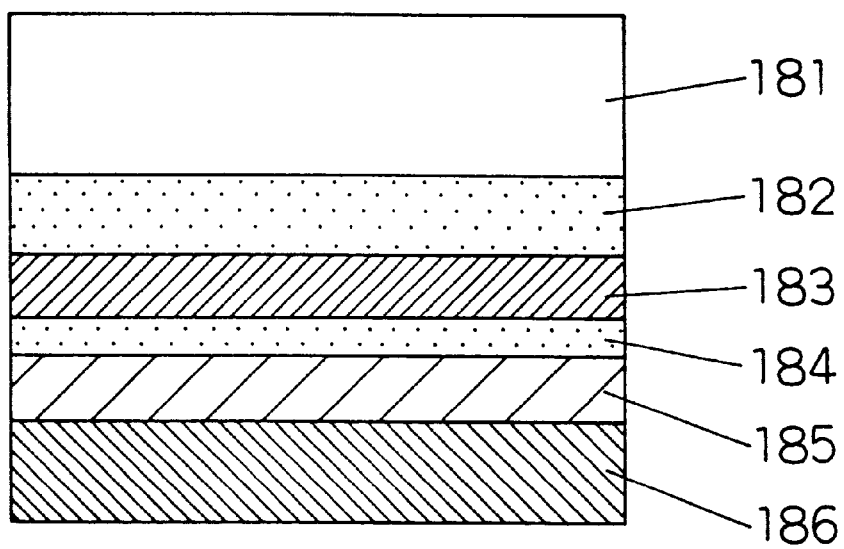
FIG. 18 is a constituent diagram of a magneto-optical recording medium in a fifth embodiment of the invention.

FIG. 18 is a sectional view showing the constitution of a magneto-optical recording medium in a fifth embodiment of the invention.

In FIG. 18, a first protection layer 182, a magnetic film 183, a second protection layer 184, and a reflectance layer 185 are sequentially formed on a substrate 181 by a RF sputtering method and a DC sputtering method or the like, and further a protection coat layer 186 is formed by a spin coating method. Showing examples of materials of constituent elements, the substrate 181 is made of glass, the first protection layer 182 and second protection layer 184 are SiN or other nitride compound film, the magnetic film 183 is a ferrite film such as a Bi Co substitution YIG film or a transition metal oxide and nitride compound film such as FeCoON, the reflectance layer 185 is a metal film such as Al film, and the protection coat layer 186 is an epoxy UV resin. The thickness of the film is, for example, 100 nm for the first protection layer 182, 100 to 300 nm for the magnetic film 183, 10 to 20 nm for the second protection layer 184, 40 nm for the reflectance layer 185, and 5 $\mu$m for the protection coat layer 166.

In the magneto-optical recording medium of the embodiment, corresponding to the recording information, the micro-structure or crystal grain size observed by transmission electron microscope in the magnetic film is varied partially, and therefore the recording apparatus used in the fourth embodiment shown in FIG. 15 is used.

By rotating the magneto-optical recording medium 151 at a constant speed of 1.4 m/sec, while scanning the recording laser beam 152 with the optical head 153, it is irradiated corresponding to the recording film at an intensity of more than 2.0 times the ordinary recording power of the rewritable magnetic film of Bi Co substitution YIG film (in this embodiment, in the composition of (Bi, Y)$_3$Fe$_{3.4}$(Co, Ge)$_{1.6}$O$_{12}$, the curie temperature is about 300° C.). By this recording process, in the recording domain area 143a, the Bi Co substitution YIG film is heated, and only in this area the crystal grains of the magnetic film are grown.

As a result, corresponding to the recording information, the mean size of crystal grain becomes larger in the recording domain area 143a than in other area.

Meanwhile, if there is a micro-structure or crystal grain boundary due to fluctuation in composition, density, crystallinity or the like which can be observed by the transmission electron microscope in the magnetic film, the homogeneity of the film is lost in that portion, and a disturbance occurs in the domain wall energy. Accordingly, since the domain wall energy is the energy reserved in the domain wall, if the domain wall energy varies with the position, in order to move the domain wall, the force expressed by its differential value is required. On the other hand, the domain wall is the region of gradual transition of the direction of spin as a source of magnetization, and possesses a specific width, and therefore when the micro-structure or crystal grain size becomes smaller than the width of the domain wall, the heterogeneity derived from them in the domain wall is averaged, and the interaction of the domain wall with them becomes smaller, and the movement of the domain wall becomes easy. That is, it is possible to change the coercive force by a certain magnitude relation between the width of the domain wall and the micro-structure or crystal grain size.

In the case of a ferrite film such as a Bi Co substitution garnet ferrite fabricated by a reactive RF sputtering method on a dielectric film such as SiN film, since the perpendicular magnetic anisotropy energy Ku is about 0.2 to $1.5 \times 10^8$ erg/cc, and the exchange stiffness constant A is about 0.3 to $1.5 \times 10^{-8}$ erg/cm, the width $\delta$ of its domain wall is estimated to be around 30 to 50 nm.

In the case of a transition metal oxide and nitride compound film such as FeON and FeCoON fabricated by a reactive ion beam sputtering method on a dielectric film such as a SiN film, since the perpendicular magnetic anisotropy energy Ku is about 4 to $8 \times 10^8$ erg/cc, and the exchange stiffness constant A is about 0.6 to $1.2 \times 10^{-8}$ erg/cm, the width d of its domain wall is estimated to be around 30 to 50 nm.

Therefore, by properly adjusting the substrate temperature when depositing the magnetic film, a magneto-optical recording medium with the size of the micro-structure or crystal grain in the magnetic film of 30 nm or less is fabricated, and then by recording with the use of the recording apparatus shown in FIG. 15(b), the micro-structure or crystal grain in the recording domain area 143a is grown over 30 nm which is the domain wall width of the magnetic film, so that the coercive force in the recording domain area 143a becomes larger than in the other area.

In the magneto-optical recording medium of the embodiment growing the crystal grain to an average size of about 45 nm, by forming a Bi Co substitution YIG film with a mean crystal grain size of about 15 nm on the substrate and heating partly, as a result of investigation of temperature dependence of coercive force in each part, it was confirmed that a coercive force difference of about 1.5 times was obtained in all temperature regions from room temperature to curie temperature.

Thus, by forming the magnetic film having the portion of 30 nm or more and the portion of 30 nm or more in the mean size of the micro-structure or crystal grain in the film, corresponding to the recording information, the magneto-optical recording medium having portions differing in the coercive force depending on the recording information is obtained.

However, in order to increase the coercive force, if the mean size of the micro-structure or crystal grain in the magnetic film is more than 30 nm, it is not enough for the magneto-optical recording medium of the embodiment. That is, it is necessary to prevent generation of noise at the time of reading derived from expansion of the average size of micro-structure or crystal grain in the magnetic film. To suppress the noise, the mean size of the micro-structure or crystal grain in the magnetic film should be 50 nm or less.

Hence, the mean size of the micro-structure or crystal grain in the magnetic film in the high coercive force portion is desired to be 30 to 50 nm.

Therefore, by reading this magneto-optical recording medium in the reading method mentioned in the Summary of the Invention in the same manner as in Embodiment 1, super-resolution reading action is possible at a low working temperature, and therefore a read-only magneto-optical recording medium of high S/N ratio capable of narrowing the track pitch is realized. Still more, the forming method of recording domains as in this embodiment is applicable in an ordinary optical disk drive, and hence it is usable not only in a read-only disk but also in a write-once disk.

As evident from the principle of the invention, the material and thickness of the constituent elements are not limited to them alone, and, for example, the first and second protection layers may be composed of other nitride films, ZnS film or other chalcogenide films, SiO film or other oxide films, or their mixture films, and the magnetic film may be composed of other 3d transition metal magnetic films having a relatively high magneto-optical effect with the width δ of about 20 to 50 nm (Co ferrite film, other ferrite film, FeON, FeCoON, or other transition metal oxide and nitride compound films).

That is, concerning the films composition, the presence of the magnetic film differing in coercive force depending on the information to be recorded is the essential constituent element of the invention, while the protection layers, reflectance layer and protection coat layers are provided properly only for keeping or improving the reliability, signal quality, or properties about heat distribution in recording and reading or the like.

In this magneto-optical recording medium, still more, corresponding to the recording information, when the portion differing in the roughness of surface of the substrate only by a specific value is provided in only a partial region on the substrate (for example, the inner peripheral region or the outer peripheral region), since the 3d transition metal compound magnetic film itself is a rewritable magnetic film, the rewritable portion can be also formed as a magneto-optical recording medium (a so-called partial ROM) disposed on the same plane.

Sixth embodiment

Another constituent example of a recording medium according to the invention is described below.

Figure 19:
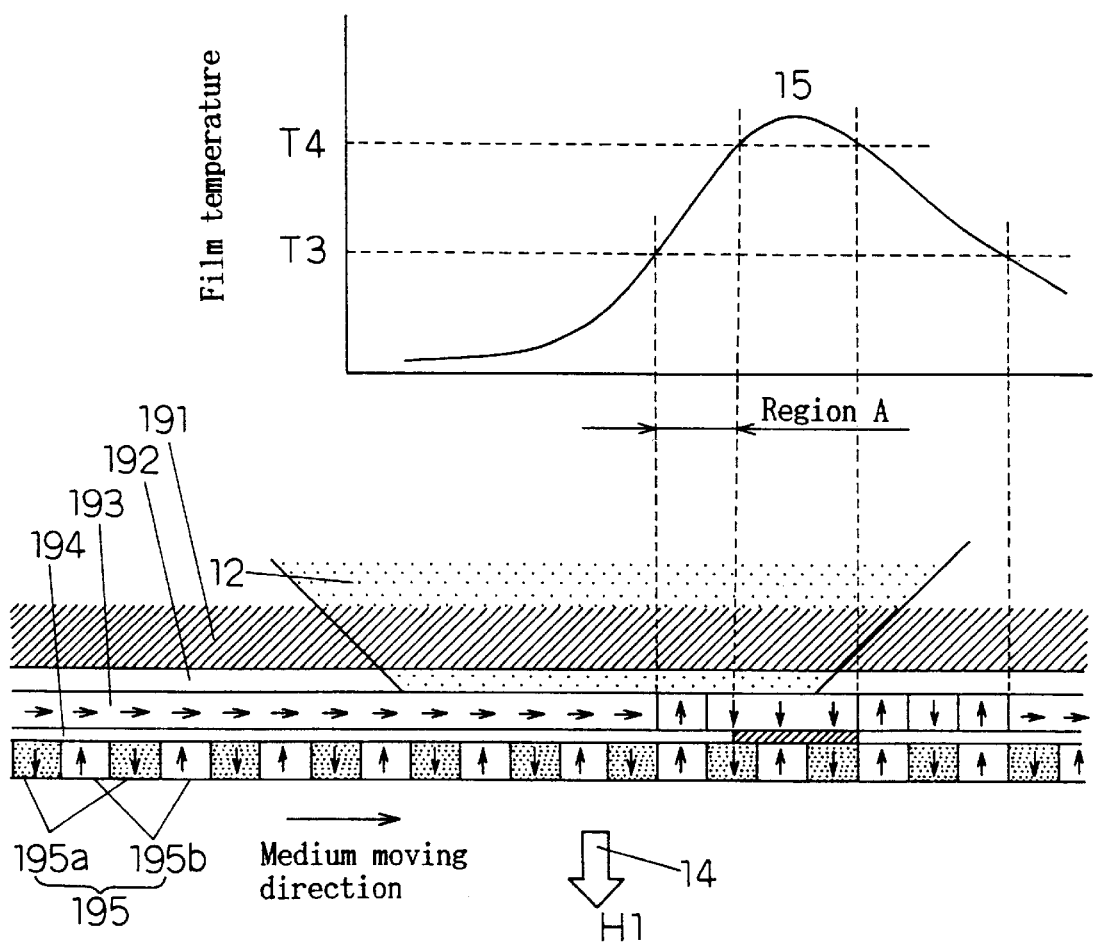
FIG. 19 is a principle diagram for explaining the operation in a sixth embodiment of the invention.

FIG. 19 shows a reading principle in an application example of the invention. In this application example, a magnetic film is formed through a protection layer 192 on a substrate 191 comprising flat portions and roughness portions depending on the information to be recorded. The magnetic film comprises a first magnetic layer 193, a second magnetic layer 194, and a third magnetic layer 195.

The third magnetic layer 194 differs in the coercive force between flat portion 195a and roughness portion 195b, and after once magnetizing in batch in a magnetic field greater than either coercive force, by magnetizing again in a magnetic field in a reverse direction larger than one coercive force and smaller than the other coercive force, a written mark is formed. For the third magnetic layer 195, a film thickness of about 40 to 60 nm is appropriate, in a rare earth-transition metal magnetic film such as TbFeCo film.

Figure 20:
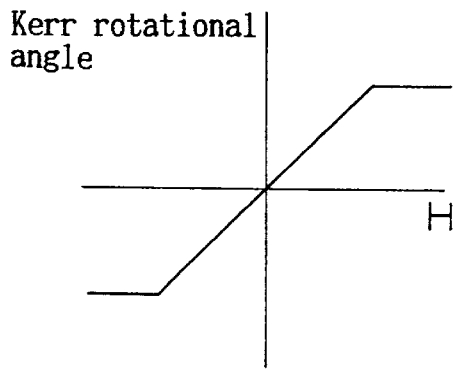
FIG. 20 is a Kerr hysteresis loop of a first magnetic layer in the sixth embodiment of the invention.
Figure 20:
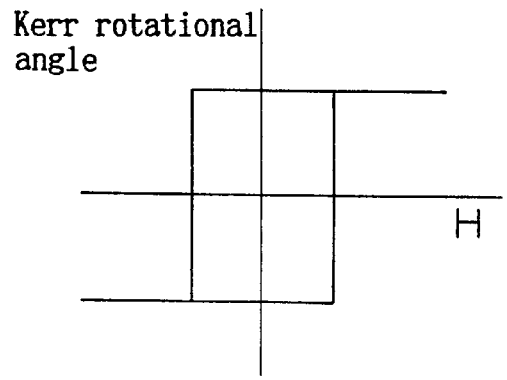
Figure 20:
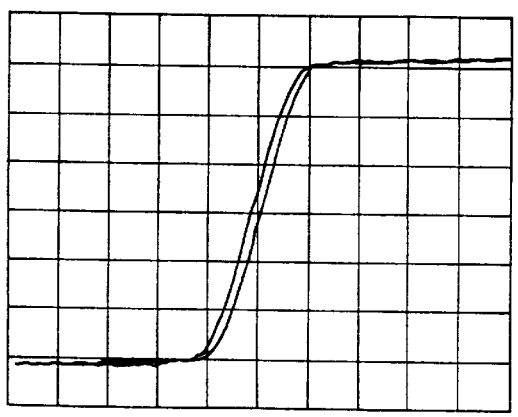
Figure 20:

The first magnetic layer 193 possesses the characteristics to be an in-plane magnetized film at room temperature and a perpendicular magnetized film at a high temperature (100 to 300° C.) as shown in FIG. 20. The magnetic film having such characteristics is realized by preparing the composition of rare earth-transition metal alloy having the characteristics to be a perpendicular magnetized film only near the compensation composition, and to vary in the compensation composition to have two types of spin in a balanced state with the temperature. Above all, the GdFeCo alloy is likely to realize the characteristics of forming an in-plane magnetized film at room temperature and a perpendicular magnetized film at high temperature (100 to 300° C.), and in the example of GdFeCo, the composition of about 26 to 31% of Gd, 50 to 70% of Fe, and 5 to 10% of Co is preferred, and $Gd_{29}Fe_{61}Co_{10}$ is one of the most preferable compositions.

The second magnetic layer 194 is to adjust the exchange coupling force acting between the first magnetic layer and the third magnetic layer, and provides the following two functions. One is the role of forming a domain wall stably between the first magnetic layer and the third magnetic layer when the first magnetic layer 194 is an in-plane magnetized film, and the other is the function of cutting off the exchange coupling force acting between the first magnetic layer and the third magnetic layer as the magnetism is lost above the curie temperature. As the second magnetic layer 194, the magnetic film in the in-plane anisotropy at curie temperature of 200 to 250° C. is preferably in a thickness of about 3 to 20 nm. These may be realized by the rare earth-transition metal film such as GdFeCo.

The third magnetic layer 195 is provided with, if necessary, a protection layer (not shown), and the reading actions are explained below.

By two times of magnetization differing in intensity and direction, a status of magnetization mutually opposite in the flat portion and roughness portion depending on the information to be recorded can be formed in the third magnetic layer, and a written mark is formed. By contrast, the first magnetic layer is an in-plane magnetized film regardless of the flat portion or roughness portion, and when exposed to an optical beam for reading 12, the magnetic film is raised in temperature. When the temperature exceeds T3, the first magnetic layer is a perpendicular magnetized film. This temperature, that is, the temperature for changing the anisotropy from the in-plane to the perpendicular direction is hardly different in the flat portion and roughness portion. At this time, the coercive force of the first magnetic layer is 100 Oe or less, and by exchange coupling, the written mark recorded in the third magnetic layer is easily copied into the first magnetic layer. When the temperature rises further until exceeding the curie temperature T4 of the second magnetic layer 194, the magnetization of the second magnetic layer is lost, thereby cutting off the exchange coupling acting between the first magnetic layer 193 and the third magnetic layer 195. At this time, the magnetization of the first magnetic layer 193 has a coercive force of 100 Oe or less whether in the flat portion or in the roughness portion, and the application is made in one direction regardless of the flat portion or roughness portion by the action of the external magnetic field 14.

Therefore, the reading signal is obtained only in the range between the temperature T1 and the temperature T2 in the reading beam irradiation region.

Thus, by contrast to the medium composition of rewritable super-resolution proposed hitherto, by forming a magnetic layer comprising different coercive force corresponding to the information to be recorded, a read-only medium of super-resolution is realized. This holds true with other rewritable compositions of super-resolution.

In this magneto-optical recording medium, moreover, by disposing the portion differing in the roughness of surface of substrate only by a certain value corresponding to the recording information, only in a partial region on the substrate (for example, the inner peripheral region or the outer peripheral region), an optical reading medium disposing a read-only super-resolution region and a rewritable super-resolution region on a same plane (a so-called super-resolution partial ROM) may be realized.

Seventh embodiment

Another constituent example of a recording medium according to the invention is described.

Figure 21A:
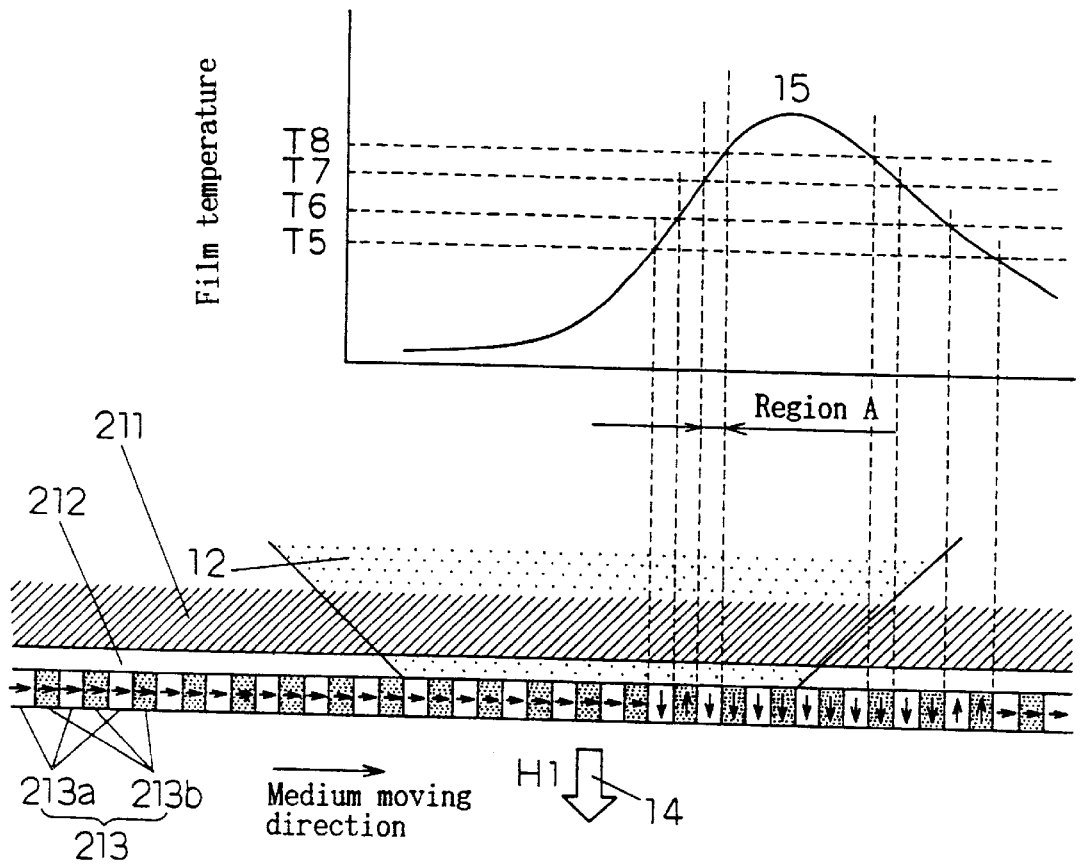
FIGS. 21(a) and 21(b) are principle diagrams for explaining the operation of a seventh embodiment of the invention.
Figure 21B:
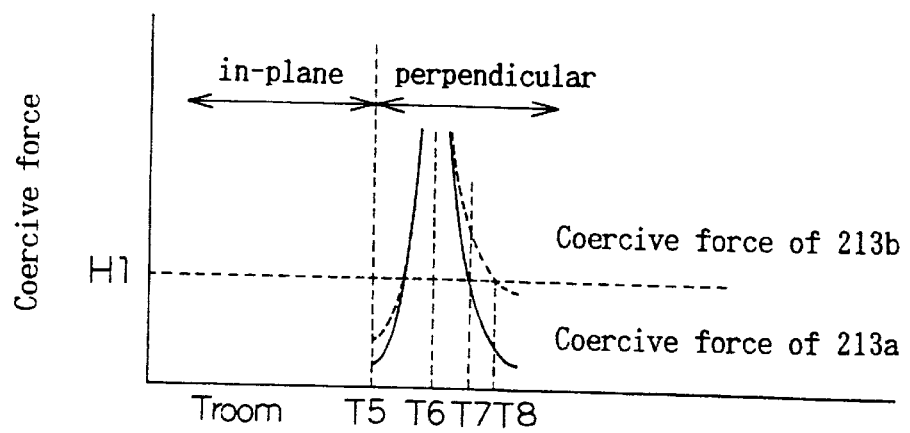

FIGS. 21(a) and 21(b) show a different principle of reading in an application of the invention. In this application example, on a substrate 211 forming flat portions and roughness portions depending on the information to be recorded, a magnetic film 213 is disposed through a protection layer 212. The magnetic film 213 is a magnetic film having a compensation temperature T6, and should be preferably GdFeCo having a perpendicular magnetic anisotropy energy only in the vicinity of the compensation temperature. The magnetic film 213 comprises a flat portion 213a and a roughness portion 213b, and both are in-plane magnetized films at room temperature, and there is no difference in coercive force. However, they are transformed into perpendicular magnetized films at temperature T5 higher than room temperature. The coercive force of the magnetic film at temperature T5 is smaller than that of the magnetic field H1 given in the reading magnetic field 14, and when transformed into perpendicular magnetized films, simultaneously, they are magnetized in the direction of H1, whether flat portion 213a or roughness portion 213b. However, the magnetic film 213 is changed from rare earth dominant to transition metal dominant magnetically at temperature T6. At this time, the coercive force of the magnetic film 213 is extremely large, and it is not affected by the reading magnetic field H1. However, when the temperature further rises, the coercive force decreases again, and the coercive force difference becomes large between the flat portion 213a and roughness portion 213b. When reaching temperature T7, the coercive force of the flat portion 213a becomes smaller than H1, and the magnetization is inverted. At this time, since the coercive force of the roughness portion 213b remains higher than H1, the magnetization is not inverted.

When the temperature further rises to exceed T8, the coercive force of the roughness portion 213b becomes smaller than H1, and the magnetization is inverted. That is, only in the portion of T7 or more and T8 or less, the information is read. After passing of the optical beam for reading, by natural cooling, it is transformed into the in-plane magnetized film again, and it is not necessary to initialize at this time.

As explained herein, in the invention, if it is an in-plane magnetized film regardless of the information to be recorded at room temperature, super-resolution reading is possible by providing a coercive force difference depending on the information to be recorded at a temperature above room temperature (T7 or more and T8 or less in this embodiment).

In this magneto-optical recording medium, moreover, by disposing the portion differing in the roughness of surface of substrate only by a certain value corresponding to the recording information, only in a partial region on the substrate (for example, inner peripheral region or outer peripheral region), an optical reading medium disposing a read-only super-resolution region and a rewritable super-resolution region on a same plane (a so-called super-resolution partial ROM) may be realized.

What is claimed is:

1. A magnetic recording medium, being a magneto-optical recording medium possessing a read-only portion and a rewritable portion, wherein the read-only portion is composed of a magnetic film possessing different magnetic anisotropy depending on informations to be recorded, and the rewritable portion is composed of a magnetic film possessing a uniform magnetic characteristic regardless of the informations to be recorded.

2. A magnetic recording medium, being a magneto-optical recording medium possessing a write-once portion and a rewritable portion, wherein the magnetic anisotropy in a written mark part is different from the other part in the write-once portion, and the rewritable portion is composed of a magnetic film possessing a uniform magnetic characteristic regardless of the presence or absence of written mark.

3. A manufacturing process of magnetic recording medium comprising a step of applying a photo resist on a glass master-substrate and heating, a step of cutting the photo resist by a laser modulated in power depending on recording information, a step of developing in a developing solution after cutting, a step of roughening the exposed portion of the glass master-substrate by plasma ion etching in using a mixed gas of $CF_4$ gas and Ne gas or a mixed gas of $CF_4$ gas and Ar gas, form the photo resist surface side after developing, a step of removing all of the photo resist formed on the glass master-substrate after plasma ion etching, a step of forming a stamper by electroforming on the glass master-substrate after removing the photo resist, a step of peeling off the stamper from the glass master-substrate, a step of forming a substrate possessing portions different in the roughness of surface corresponding to the recording information by using the stamper, and a step of depositing a magnetic film on the substrate.

4. A manufacturing method of magnetic recording medium comprising a step of applying a photo resist on a glass master-substrate and heating, a step of roughening the photo resist surface by plasma ion etching in a mixed gas of $N_2$ gas and He gas or a mixed gas of $O_2$ gas and He gas, a step of smoothing by softening the roughened photo resist surface by laser modulated in power depending on the recording information after plasma ion etching, a step of forming a stamper by electroforming on the photo resist after cutting, a step of peeling off the stamper from the glass master-substrate and photo resist, a step of forming a substrate possessing portions different in the roughness of surface depending on the recording information by using the stamper, and a step of depositing a magnetic film on the substrate.

5. A recording method of magnetic recording medium, wherein by recording at an intensity of light capable of mutually diffusing a multi-layered magnetic film and additive element film, when recording information into a magneto-optical recording medium composed of a magnetic film possessing a certain magnetic anisotropy and a film of an additive element for increasing or decreasing the magnetic anisotropy of the magnetic film, such portions are formed that are different in a magnitude of magnetic anisotropy, corresponding to the recording information, and are different in a coercive force of the magnetic film in each portion.

6. A recording method of magnetic recording medium of claim 5, wherein the magnetic film to be layered is a rare earth-transition metal magnetic film, and the film of additive element is heavy rare earth metal film or transition metal film.

7. A recording method of magnetic recording medium, wherein by recording at an intensity of light capable of growing crystal grains or micro-structures observed by transmission electron microscope in a magnetic film, when recording information into a magneto-optical recording medium of which magnetic film is composed of a crystalline magnetic film, such portions are formed that are different in a size of micro-structures or crystal grains, depending on the recording information, and are different in a coercive force of the magnetic film in each portion.

8. A reading method of magneto-optical recording medium wherein varying a status of magnetization of a magneto-optical recording medium by a bias magnetic field, while reading a magneto-optical recording medium providing magneto-optical magnetic films possessing different coercive forces depending on informations to be recorded, at least in a part.

9. A reading method of magneto-optical recording medium of claim 8, wherein it is read while returning the changed status of magnetization into an initial status, by an initializing magnetic field provided separately from the bias magnetic field.

* * * * *